United States Patent

Armstrong

[15] 3,664,951
[45] May 23, 1972

[54] APPARATUS AND PROCESS TO TREAT WASTE WATER FOR POLLUTION CONTROL AND INDUSTRIAL REUSE

[72] Inventor: Louis B. Armstrong, Houston, Tex.

[73] Assignee: Pollution Engineering International, Inc., Houston, Tex.

[22] Filed: July 22, 1970

[21] Appl. No.: 57,198

[52] U.S. Cl..................................210/44, 210/50, 210/62, 210/104, 210/96, 210/109, 210/195, 210/525, 204/149, 210/46
[51] Int. Cl........................................C02b 1/36, C02b 1/82
[58] Field of Search...................204/149; 210/44, 46, 47, 50, 210/63, 61, 62, 96, 104, 109, 195, 190, 221, 525

[56] References Cited

UNITED STATES PATENTS

| | | | |
|---|---|---|---|
| 1,957,898 | 5/1934 | Mitchell | 210/96 |
| 2,989,037 | /1961 | Filippino et al. | 210/96 X |
| 3,523,891 | 8/1970 | Mehl | 210/44 |
| 3355,019 | 11/9967 | Mitchell | 210/104 |

Primary Examiner—Michael Rogers
Attorney—Thomas B. Van Poole, Francis A. Keegan, S. Ellwood Wilson and Peter N. Lalos

[57] ABSTRACT

Apparatus and process for removing colloidal, oxygen demanding and odor causing organic materials, inorganic materials and other pollutants from waste water is provided. The initial pH and resistivity of the water is measured and adjusted to predetermined values. The color of the water is then measured and organic and inorganic materials are caused to precipitate from the water which is then subjected to a predetermined density of electrical current. The electrolysis coalesces colloidal materials which are removed mechanically and causes additional material precipitation, as well as acting to kill bacteria, viruses and other organic matter. Additional inorganic matter precipitation is induced and the water has a final pH, color and resistivity adjustment. An oxidizing agent is added to further reduce oxygen demanding and odor causing organic material and act on bacteria and other organic matter remaining. The water is then reusable or may be discharged into streams or sewer facilities.

58 Claims, 13 Drawing Figures

L. Brannan Armstrong
INVENTOR

BY
Arnold, White & Durkee
ATTORNEYS

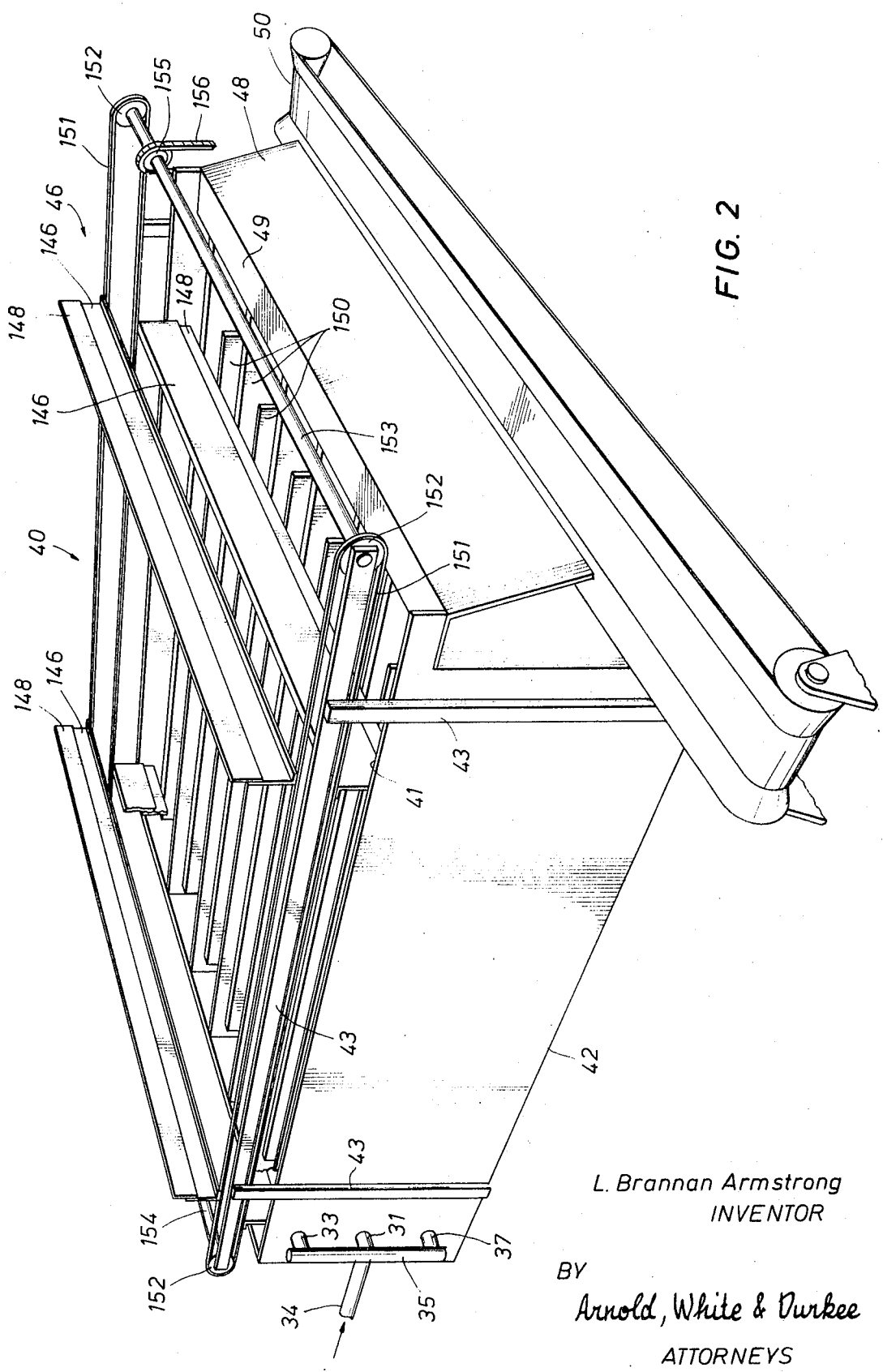

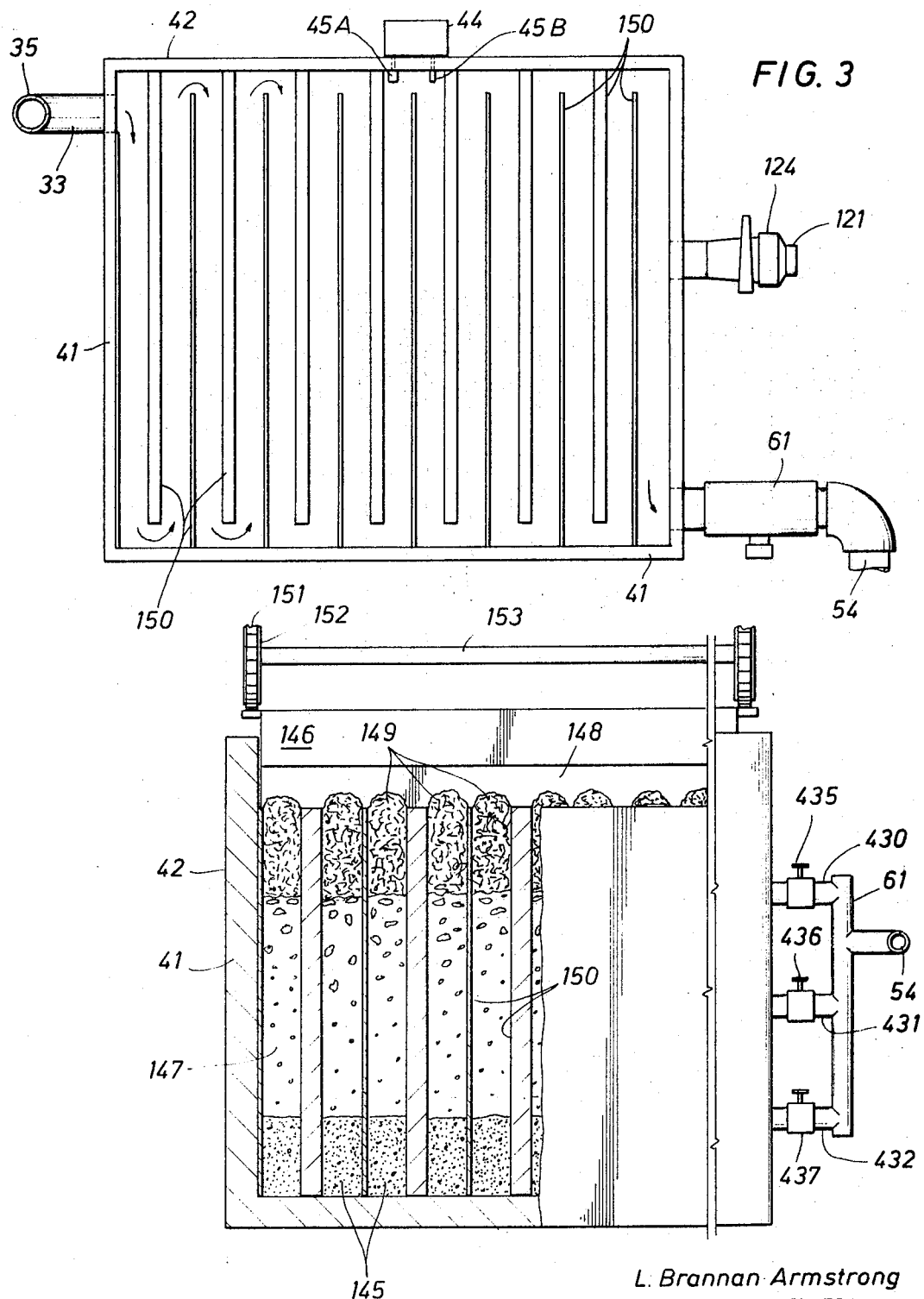

L. Brannan Armstrong
INVENTOR

BY
Arnold, White & Durkee
ATTORNEYS

L. Brannan Armstrong
INVENTOR

BY

Arnold, White & Durkee
ATTORNEYS

Patented May 23, 1972

L. Brannan Armstrong
INVENTOR

BY

Arnold, White & Durkee
ATTORNEYS

Patented May 23, 1972

L. Brannan Armstrong
INVENTOR

BY

Arnold, White & Durkee
ATTORNEYS

Patented May 23, 1972

L. Brannan Armstrong
INVENTOR

BY

Arnold, White & Durkee
ATTORNEYS

Patented May 23, 1972

L. Brannan Armstrong
INVENTOR

BY

Arnold, White & Durkee
ATTORNEYS

APPARATUS AND PROCESS TO TREAT WASTE WATER FOR POLLUTION CONTROL AND INDUSTRIAL REUSE

BACKGROUND OF THE INVENTION

With the ever increasing problems of air and water pollution caused by our industrial technology, many industries are threatened by the tightening standards on air and water pollution. Particularly in the area of water pollution, many industries foul waterways and sewage systems with rinse waters and other discharges containing high percentages of dissolved metals, organic materials, chemicals and particularly "detergents" and other minerals that effect the quality and purity of the water. Such industries are the paper, steel, mining and various chemical industries. Though technology for treating such water discharge is available, it is extremely costly and few industries have been able to afford to install pollution treatment apparatus of the present technology, primarily based on chemical means of treating polluted water. Because of the high cost involved, few industries are willing to invest in such clean up apparatus and processes until they are forced to do so by federal and/or state law.

Most of the present technology utilizes processes that are primarily chemical processes for attempting to cause precipitation of various minerals and dissolved metals and removal of various materials which "color" the water and give it noxious odors. Electrolysis is not new in the sense that it has been used experimentally in pollution control systems, however, the cost of such systems has been prohibitive, because of the high voltages needed and the inefficiency of the system.

The present invention remedies these problems of the prior art by providing an electrolysis system for rendering water reusable or can be approved for disposal in public sewage facilities, public streams and rivers.

SUMMARY OF THE INVENTION

The instant invention provides a novel system designed to process large volumes of industrial waste water that contain colloidal materials and other undesirable pollutants. Colloidal materials are finely disseminated materials in the water. They give color and odor to industrial waste water. Colloidal materials remain suspended because of a small difference in specific gravity of the particles in the surrounding water. These particles are uniformly electrically charged, and many colloids, including proteins, starches, celluloses, polypeptides and other substances possess negative charges. Other colloids are positively charged. These small particles can be removed by electrically disturbing this charge by an electrolysis process and causing the particles to coalesce. The particles so coalesced frequently do not have an adequate specific gravity for precipitation to the bottom of a tank in which the water is being treated, but they may be removed by foaming and mechanically removing the foam from the water surface.

Electrodes used in this electrolysis process can be of many materials, but since one electrode will be gradually disintegrated during the electrolysis process, the electrodes are put to work to perform other duties. As electric current passes between the electrodes, the colloidal particle sizes become larger and larger until they are sufficiently large to trap bubbles of oxygen and hydrogen that are being evolved at the electrodes. These bubbles float the particles to the surface of the water as foam and then may be removed by mechanical means above mentioned. The foam from most waste water will be made up of organic material and can be burned or dried for recovery of valuable minerals or stored for disposal at approved disposal areas.

Demineralization and demetalization of the industrial waste water can be accomplished at the same time that the colloidal organic material is being removed via the process of foaming. Electric current that causes the colloidal material to be removed will create ions of whatever material of which the electrodes are composed, and these ions will generate a floc which can be utilized to precipitate various minerals, dissolved metals and other inorganic materials present in the water. Since various metals and their ions will produce different types of floc for precipitating various types of minerals and inorganic matter, the electrodes can be selected to do specific jobs. Aluminum and carbon electrodes may be selected to remove temporary hardness, zinc electrodes may be used to reduce water toxicity, kill viruses and reduce floc settling time. Iron electrodes may be used if the water contains sulfides.

In addition to removing the colloidal material and precipitating the dissolved minerals and inorganic material, bacteria, algae and other oxygen-demanding matter may be destroyed by electrolysis. The oxygen generated and bubbling through the water makes intimate contact with organic material and will oxidize these organic materials as well as odorous gases of organic origin. Further, should the water have some chloride salts in it, these salts will break down and give off free chlorine gas which will also help kill bacteria and reduce odors.

The system utilizes flowmeters to measure the flow rate of the water passing through the apparatus for adjustment of the electrode apparatus and quantity of oxidant necessary to treat the water. The pH of the polluted waste water is measured initially and is brought to a desired level, generally in the range of 5.0 to 5.5, by treatment in a preliminary treatment tank involving the addition of either necessary caustic or acid solutions to reach the desired pH level. Further, a certain quantity of "seed" floc is introduced into the preliminary treatment tank to initially precipitate a large quantity of organic and inorganic materials from the polluted water prior to treatment in the electrode tanks in order to lighten the load carried by the electrode tanks performing the electrolysis process, thereby drastically cutting the power requirements for the electrolysis process. The resistivity of the water discharged from the preliminary treatment tank is measured and if the resistivity is too low, higher resistivity water from the system in an advanced state of treatment is recycled back to a mixing tank to raise the resistivity of the water prior to being applied to the first electrode tank assembly.

In the electrode tank assembly, organic materials are coalesced and bubbled to the surface as foam, as hereinabove described, where they are removed by the action of mechanical paddles which sweep the foam from the surface of the electrode tank and discharge it into a suitable conveying means for transportation to a preferred form of disposal means, such as a burner, in which the organic materials may be dried and reclaimed later if desired or burned completely leaving an inorganic residue. Additional floc precipitation is induced in the first electrode tank, as hereinabove described, to reduce the quantity of inorganic materials and improve the "color" of the water. The water discharged from the electrode tank assembly is then delivered to a floc settling tank.

The water discharged from the first electrode tank assembly contains a quantity of floc and is used as a seeding floc in the first floc settling tank, allowing the water to circulate through the floc precipitate causing additional formation of floc and thereby removing additional organic and inorganic materials from the water. The water discharge from the first floc settling tank is then applied as an input to a second electrode tank assembly if one is necessary for further treatment of the water. In a second electrode tank assembly, a different combination of electrode materials may be utilized than was used in the first electrode tank assembly, in order to cause coalescing and foaming of additional organic materials and to cause additional floc precipitation of other organic and inorganic materials not removed in the first electrode tank assembly or the first floc settling tank.

As was hereinbefore described for the first electrode tank assembly, the materials foamed to the surface of the second electrode tank are removed by a series of paddles that sweep the foam from the surface of the electrode tank and deposit it in a suitable conveying means for transfer to the desired disposal means. The output of the second electrode tank is discharged to a second floc settling tank along with a quantity of seeding floc from the electrode tank, as was done in discharging treated water to the first floc settling tank. The second floc settling tank allows additional organic and inorganic materials to be precipitated from the water thereby improving its color and completing the demineralization and demetalizing process. However, there may be cases in which, because of the various and many combinations of minerals and dissolved metals and other materials in the polluted water, additional electrode tank assemblies and floc settling tanks may be necessary to accomplish the process. However, it has been found that the combination of two electrode tank assemblies and two floc settling tanks will handle substantially all industrial polluted waste water presently known.

The water discharged from the second floc settling tank may be used directly in most instances for reuse as process water, cooling water, or as boiler feedwater in industrial applications. However, if the water is to be discharged to a stream or river, it would be necessary to put the water through a final pH an oxidation step in order to meet federal and/or state requirements. The Public Health Service requires a certain residual chlorine be present in water prior to disposing of waste fluids in public streams. This requirement is an attempt to kill any bacteria, reduce color and odors, and to reduce the oxygen demand of organic matter still present in the disposed water.

To provide for such final pH and oxidant adjustment, the invention described herein further includes the use of a pH and oxidant adjustment tank for receiving the water discharged from the final floc settling tank. The pH, resistivity and color of the water discharged from final floc settling tank are all measured, and these measurements are utilized to either add a caustic or acid solution from appropriate sources to adjust the pH to a final predetermined level. The required quantity of oxidant for oxidizing the water in the tank for the purposes hereinbefore mentioned is also added. The water discharge from the pH and oxidant adjustment tank is discharged into a final polishing pond, merely a storage tank, in which the water is allowed to stand for a short period of time for allowing the oxidation material introduced in the oxidant adjustment tank to further act on the water in an attempt to kill additional bacteria, reduce odors and to reduce the oxygen demand of remaining organic material. The water discharged from the final polishing pond may then be reused in the industrial system, or discharged into public sewage systems, streams, lakes or rivers.

The system as described herein utilizes an oxidant generator assembly employing a chlorine generator for supplying chlorine as the oxidation material for use in the oxidant adjustment tank as well as a convenient means for producing the caustic and acid solutions for use in the pH adjustment of the water at various stages in the system.

The floc precipitate in the electrode tank assemblies and floc settling tanks will continue to build up in the bottom of the tanks and would eventually fill each of the tanks unless discharged. Accordingly, floc height sensors are utilized for monitoring the height of the floc precipitate in each tank, and when it has reached a predetermined level, a solenoid valve is actuated allowing a portion of the floc precipitate to be discharged from each of the tanks to a central floc accumulation tank for use as seeding floc in the preliminary treatment tank as hereinbefore described. The excess floc accumulation in the preliminary treatment tank and the floc accumulation tank, is discharged directly to the desired disposal means as waste material.

Accordingly, the instant invention provides a novel water pollution control system utilizing an electrolysis process for advantageously treating large volumes of waste water that contain colloidal organic materials and other undesirable inorganic materials and pollutants.

Another feature of the present invention is to provide electrolysis apparatus for treating colloidal organic materials and generating a floc precipitate of various minerals and inorganic materials from the water, adjusting the pH of the water and its color and introducing an oxidant for killing bacteria and viruses and reducing the oxygen demand of organic material remaining in the treated water.

Yet another feature of the present invention is to provide apparatus and a process for performing an electrolytic treatment of polluted waste waters that will provide an inexpensive solution to the processing of large volumes of industrial waste water from many and varied industrial sources.

Still another feature of the present invention is to provide apparatus and process for preliminarily treating the polluted water and precipitating a large amount of mineral, organic and inorganic materials from the water prior to passing the water through the electrolysis process, thereby lessening the load on the electrolysis apparatus and significantly lowering the electrical power requirements.

BRIEF DESCRIPTION OF THE DRAWINGS

In order that the manner in which the above-recited advantages and features of the invention are attained, as well as others which will become apparent, can be understood in detail, a more particular description of the invention may be had by reference to the specific embodiments thereof which are illustrated in the appended drawings, which drawings form a part of this specification. It is to be noted, however, that the appended drawings illustrate only particular embodiments of the invention and therefore are not to be considered limiting of its scope for the invention may admit to further equally effective embodiments.

In the drawings

FIG. 2 is a perspective view of an electrode tank assembly as utilized in the water pollution control system shown in FIG. 1.

FIG. 3 is a plan view of an electrode tank assembly with the foam paddle assembly removed to show the arrangement of the electrodes in the tank.

FIG. 4 is a partial detailed vertical cross-sectional view of an electrode tank assembly showing the foaming and floc precipitation action resulting from electrolysis of the water under treatment, and the action of the paddle assembly in removing foam from the electrode tank.

DETAILED DESCRIPTION OF THE PREFERRED EMBODIMENTS

Figure 1:
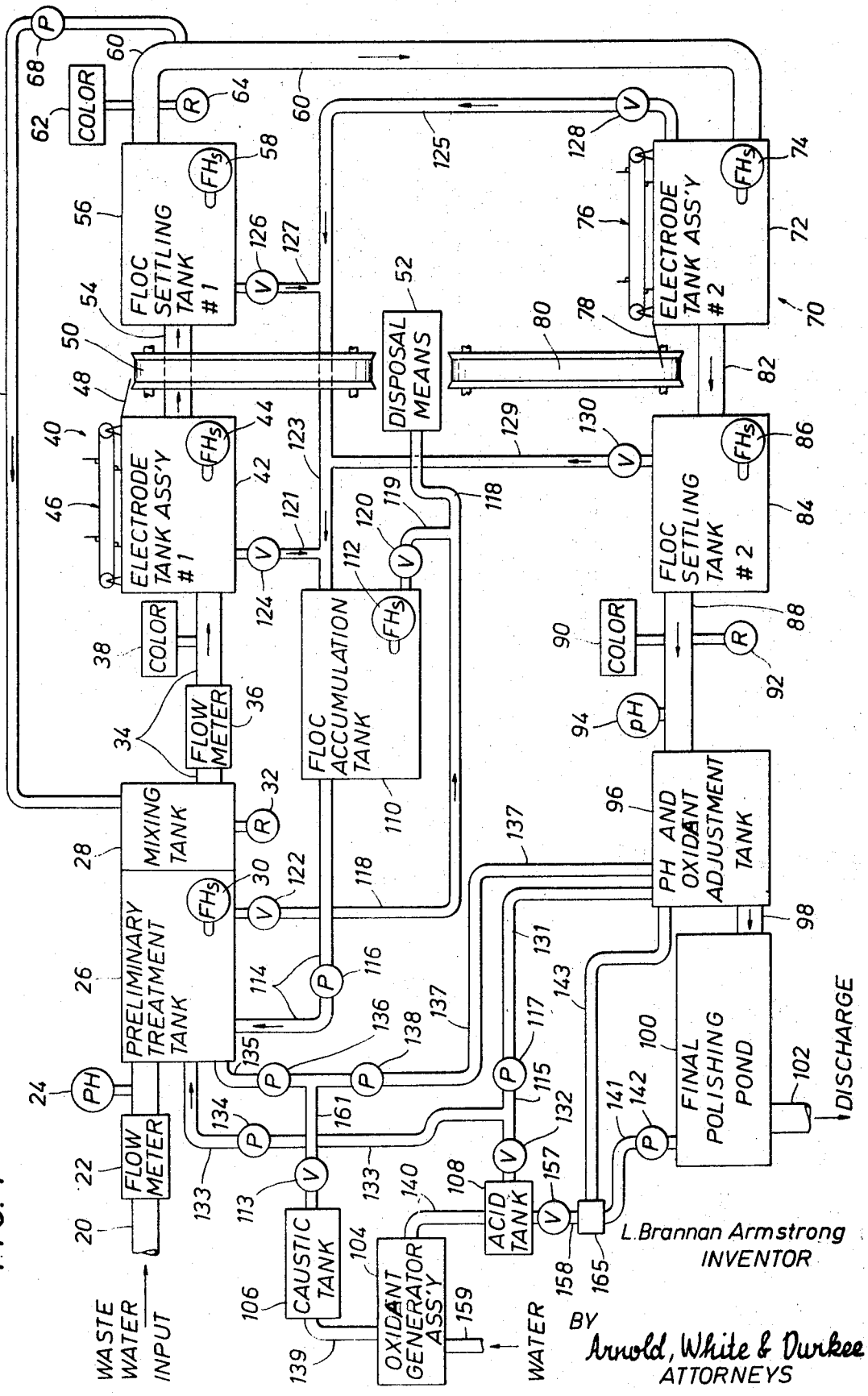
FIG. 1 is a detailed mechanical schematic of the water pollution control system according to the invention disclosed.
Figure 9:
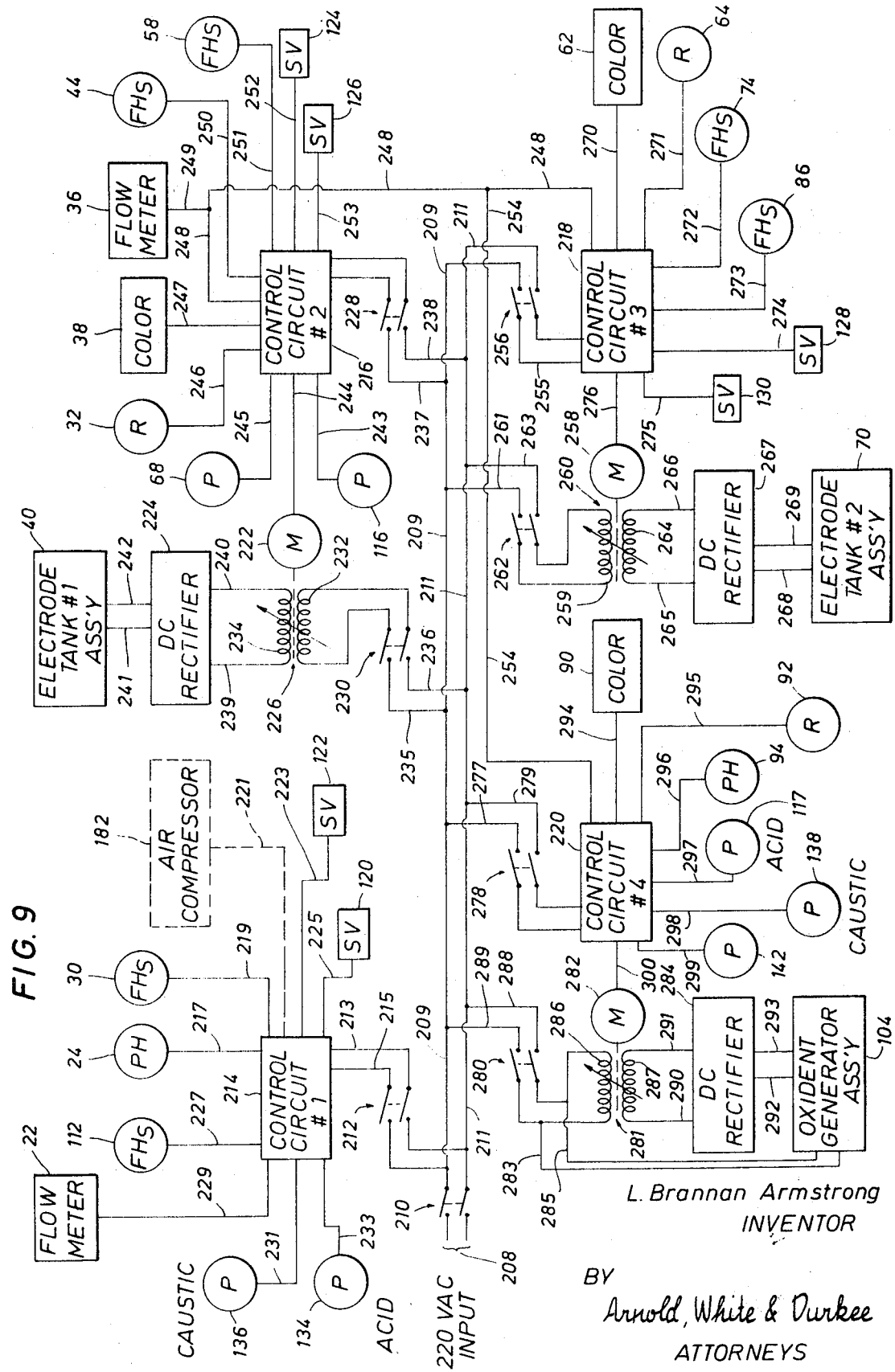
FIG. 9 is a detailed block diagram of the electrical control circuit of the water pollution control system shown in FIG. 1.

Referring now to FIGS. 1 and 9, the polluted waste water to be treated enters the system as an input through pipe 20 and flow meter 22 into the preliminary treatment tank 26. Just prior to entry into the preliminary treatment tank, the pH of the polluted waste water is measured by a pH meter 24. Flow meter 22 may be any standard positive displacement or turbine-type flow meter generating an electrical signal output proportional to the flow rate and volume of the water passing through pipe 20.

The pH meter is typically a "glass electrode" or half-cell in which electrical potential measurements are made through a glass membrane, indicating the pH of the solution. The electrical potential developed by the glass electrode is transmitted via conductor 217 to the first control circuit 214 of the system control as shown in FIG. 9.

Simultaneously, the flow meter 22 is generating a series of electrical signals proportional to the flow rate and volume of the water passing through pipe 20, and these signals are transmitted via conductor 229 to the first control circuit 214. Once control circuit 214 receives signals from flow meter 22, indicating that waste water flow is initiated, the control circuit 214 will actuate either the acid pump 134 or the caustic pump 136 to introduce either an acid or caustic solution from acid tank 108 or caustic tank 106 via pipes 133 or 135, respectively, to tank 26. Depending upon the pH measured by meter 24, the caustic or acid solution added to the preliminary treatment tank 26 adjusts the pH of the incoming polluted waste water to a predetermined desired level.

Seeding floc from the floc accumulation tank 110 is pumped via pump 116 and pipe 114 into the preliminary treatment tank 26 for mixing with the incoming polluted waste water and the acid or caustic solution being added. As the polluted waste water enters and travels through the preliminary treatment tank 26 to the mixing tank 28, grit, sand and other heavy materials will settle to the bottom of the tank. The seeding floc introduced will cause precipitation of some dissolved minerals and organic material in the polluted water, removing some color from the polluted waste water.

The level of the precipitated materials is measured by a floc height sensor 30 in the preliminary treatment tank 26. A floc height sensor typically utilizes a closely spaced light source 45A and a photocell 45B disposed inside the tank at the desired level of the floc bed. The photocell 45B generates an electrical signal proportional to the light received after the light beam from the light source 45A has passed through the water and accumulated floc bed. The electrical signal generated is transmitted via conductor 219 (see FIG. 9) to the first control circuit 214. When sensor 30 has sensed the predetermined level of the precipitated material in preliminary treatment tank 26, the first control circuit signals solenoid valve 122 via conductor 223, opening valve 122 and allowing floc precipitate in the bottom of tank 26 to flow by gravity through pipe 118 to disposal means 52. Disposal means 52 is advantageously a burner where the floc material is either dried for reclamation of various minerals and metals precipitated in the floc, or burned and reduced to carbon dioxide ($CO_2$), water ($H_2O$), and inorganic ash which is discharged for disposal or reclamation. Of course, other disposal means may be utilized. While the discharge of the floc precipitate from the bottom of preliminary treatment tank 26 through pipe 118 is accomplished by gravity as hereinabove described, it may readily be seen that depending on the layout of the system, pumps may be utilized to remove the floc precipitate from an appropriate tank to the desired disposal means 52.

As the preliminarily treated water leaves the treatment tank 26, it enters mixing tank 28 where the resistivity of the water is measured by resistivity meter 32. Resistivity meter 32 may be any conventional liquid resistivity measuring means. As shown in FIG. 9, the electrical signal output of the resistivity meter 32 is applied via conductor 246 to the second control circuit 216. If the resistivity of the water in mixing tank 28 is below the desired level prior to treatment in the first electrode tank assembly 40, the second control circuit will actuate pump 68 via conductor 245 and recycle a portion of the affluent discharge in pipe 60 from the first floc settling tank 56 to be returned through pipe 66 into mixing tank 28. Since the water discharged via pipe 60 from the first floc settling tank 56 has had organic and inorganic material removed as will be hereinafter described, it has a much higher resistivity than the water preliminarily treated in tank 26, and addition of this recycled water will dilute the waste water in mixing tank 28 and increase its resistivity.

The output of mixing tank 28 is discharged via pipe 34 through a second flow meter 36 and introduced into first electrode tank assembly 40 through a manifold 35 and vertically spaced inlet pipes 31, 33 and 37 for vertically injecting the water over the entire height of the electrodes for uniform distribution. Depending on the size of electrode tank 40, manifold 35 may have more or less injection pipes into the electrode tank as needed.

Flow meter 36 may be identical to the flow meter 22 previously described, and its electrical signal output is applied via conductors 249 and 248 to the second electrical control circuit as shown in FIG. 9. In addition, the color of the water is sensed by color meter 38 prior to its input into the first electrode tank assembly 40. Color meter 38 is a conventional color meter utilizing a closely spaced light source and photocell pickup, the electrical signal output generated by the photocell varying directly in response to the color of the water, or the amount of light that is able to pass through the finely suspended colloidal materials in the water. This generated electrical signal is transmitted to the second control circuit 216 via conductor 247.

Depending on the volume, flow rate and color of the water, the second control circuit 216 will regulate the electrical power requirement needed by the electrodes in the first electrode tank assembly 40. Further, if the color of the water exceeds predetermined limits, pump 116 is actuated via signals from control circuit 216 through conductor 243, to pump additional seeding floc from the floc accumulation tank 110 through pipe 114 to the preliminary treatment tank 26. The additional seeding floc is used to precipitate additional minerals, organic and inorganic materials from the water until the color meter reads an acceptable color level.

The water entering electrode tank assembly 40 through pipe 34 passes through a labyrinth of vertically oriented electrodes, spaced from ⅛ inch to 2 inches apart as required to treat the water, and made up of varying materials or combinations of materials as required for treating the specific polluted waste water. In electrode tank assembly 40, the colloidal material suspended in the water is electrically treated by the passage of direct current between the electrodes for reorienting the particle polarity and causing the colloidal particles to coalesce and float to the surface as foam as will be hereinafter more particularly described in detail. This foam is then removed from the electrode tank assembly by a foam paddle assembly 46. The foam removed by the paddle assembly 46 is deposited onto a ramp 48 where the foam slides by gravity onto a conveying means 50 which transports the foam to a disposal means 52 hereinabove described.

At the same time that the colloidal organic material is being removed by the process of foaming, demineralization of the waste water is being accomplished by floc generated by the specific electrode material being utilized. The floc so generated is formed and traps dissolved minerals and metals not removed in the preliminary treatment tank 26. Some of this floc precipitate settles to the bottom of the electrode tank 42, the level of which is monitored by a floc height sensor 44. Floc height sensor 44 is identical to the floc height sensor 30 utilized in the preliminary treatment tank 26 hereinabove described. The electrical signal output of floc height sensor 44 is transmitted via conductor 250 to the second control circuit 216 as shown in FIG. 9, and solenoid valve 124 is actuated via a signal transmitted through conductor 252 for opening valve 124 and allowing excess floc precipitate to drain through pipe 121 into the floc accumulation tank 110. Of course, if the floc accumulation tank is not advantageously located for suitable removal of the floc precipitate from electrode tank 42 by gravity, a pump may be utilized as hereinbefore described in connection with tank 26.

The treated water from electrode tank assembly 40 is discharged via vertically spaced pipes 430, 431 and 432 into a manifold 61 and through pipe 54 for introduction into the first floc settling tank 56. As will be hereinafter more particularly described, it is critical that some floc precipitate is transferred with the treated water through pipe 54 into the floc settling tank 56 where it acts as a seed floc in tank 56 for promoting additional floc growth and precipitation. To control the quantity of floc precipitate transferred from electrode tank 40 to the settling tank 56, each of the discharge pipes 430, 431 and 432 have respective valves 435, 436 and 437. By opening or closing the valves in any combination, the quantity of floc precipitate transferred with the water discharged from electrode tank 40 may be controlled as desired.

As the floc generated in floc settling tank 56 coalesces into larger and heavier particles, their weight then causes faster settling of the floc to the bottom of the tank. The level of floc is sensed by the floc height sensor 58 for maintaining a constant floc bed height in the bottom of tank 56. The floc height sensor 58 is, of course, identical to the floc height sensors 44 and 30 hereinabove described. The electrical signal output from floc height sensor 58 is transmitted via conductor 251 to the second control circuit which in turn actuates solenoid valve 126 with an electrical signal transmitted via conductor 253, opening valve 126 and allowing excess floc from tank 56 to be discharged through pipes 127 and 123 to the floc accumulation tank 110 in the same manner as previously described for electrode tank assembly 40.

The output of floc settling tank 56 is discharged into pipe 60 as an input to a second electrode tank assembly 70. As the treated water from floc settling tank 56 is discharged through pipe 60, color and resistivity are measured by color and resistivity meters, 62 and 64, respectively. The electrical signals of the color meter 62 are transmitted via conductor 270 to the third control circuit 218, while the electrical output of resistivity meter 64 is applied via conductor 271 to the control circuit 218 for regulating the electrical power requirements needed by electrodes in the second electrode tank assembly 70. Color meter 62 and the resistivity meter 64 are identical to the color meter 38 and resistivity meter 32 hereinabove described.

Electrode tank assembly 70 may have its electrodes spaced equal to or closer than the spacing of the electrodes in the first electrode tank assembly 40. In addition, the electrode materials in electrode tank assembly 70 may be different than the electrodes in electrode tank assembly 40, depending on the quality of the polluted waste water under treatment, and the type of materials desired to be removed from the water.

Additional oxidation of the waste water will occur in electrode tank assembly 70, as well as removal of additional organic and inorganic material as described above for electrode tank assembly 40. The height of the floc precipitate in electrode tank 72 is measured by floc height sensor 74, identical to the floc height sensors hereinbefore described. The electrical signal output of floc height sensor 74 is applied via conductor 272 to the third control circuit 218 which actuates solenoid valve 128 via conductor 274, opening the valve and allowing excess floc precipitate to be discharged from electrode tank 72 through pipes 125 and 123 to the floc accumulation tank 110.

The water entering the second electrode tank assembly 70 passes through a labyrinth of electrodes as hereinabove described for the first electrode tank assembly 40, where the colloidal materials suspended in the water are electrically charged by the passage of direct current between the electrodes to coalesce the colloidal particles and cause them to be floated to the surface as foam as will be hereinafter more particularly described. This foam is then removed by paddle assembly 76 and deposited on the ramp 78 where it slides onto a conveying means 80 for transportation to disposal means 52, hereinbefore described.

The treated water from electrode tank 72 is discharged through pipe 82 to the second floc settling tank 84, where additional floc precipitation occurs as above described for the first floc settling tank 56. Floc height sensor 86 maintains a constant height of floc precipitate in floc settling tank 84 by applying an electrical signal via conductor 273 to the third control circuit 218 which in turn actuates solenoid valve 130 via an electrical signal through conductor 275. Valve 130 opens, and excess floc precipitate is discharged through pipe 129 into the floc accumulation tank 110, as hereinbefore described for electrode tanks 42 and 72, and floc settling tank 56.

The system shown in FIG. 1 utilizes a combination of two electrode and floc settling tanks to accomplish its treatment of the waste polluted water. Of course, depending on the degree of pollution of the water and the types of colloidal organic materials, dissolved minerals and other inorganic materials present in the water to be treated, additional electrode and floc settling tanks may be added in the system as required. Of course, in some simple applications only a single electrode tank assembly and a single floc settling tank may be necessary.

The treated water output of floc settling tank 84 is discharged through pipe 88 to a pH and oxidant adjustment tank 96. The color, resistivity, and pH of the water flowing through pipe 88 are measured by meters 90, 92 and 94, respectively. The color meter 90, the resistivity meter 92 and the pH meter 94 are identical to the meters hereinabove described for accomplishing the same measurements. The electrical output of color meter 90 is applied via conductor 294 to the fourth control circuit 220; the electrical control signal from the resistivity meter 92 is applied via conductor 295 to control circuit 220; and the electrical signal from the pH meter 94 is applied via conductor 296 to control circuit 220. As may be seen in FIG. 13, the control signals from flow meter 36, color meter 90 and resistivity meter 92 are applied to motor 282 for controlling variable transformer 281 for controlling the electrical power requirement of the oxidant generator assembly 104 (see FIG. 9). Control circuit 220 also operates pumps 117 and 139 via conductors 297 and 298, respectively, distributing either a caustic solution from tank 106 through pipes 161 and 137 or an acid solution from tank 108 through pipes 115 and 131 to the pH and oxidant adjustment tank 97 for the final pH adjustment phase of the system.

The fourth control circuit 220 also energizes motor 282 for controlling a variable transformer 281. 220 volt AC electrical power is supplied via conductors 209, 211, 288 and 289, switch 280, and conductors 283 and 285 to the oxidant generator assembly 104 for generating the necessary oxidant supply for oxidizing the water in tank 96. The quantity of oxidant needed is determined by demand, which is proportional to the electrical power supplied to the oxidant generator assembly electrodes via conductors 292 and 293 from DC rectifier 284. Power to rectifier 284 is supplied from the secondary winding 287 of variable transformer 281 via conductors 290 and 291. AC power to the primary winding 286 of transformer 281 is supplied via conductors 209, 211, 288, 289 and switch 280, respectively. Motor 282 varies the coupling between the primary and secondary windings of transformer 281, thus varying the AC power applied to the DC rectifier and varying the DC output to the oxidant generator assembly electrodes for determining the quantity of oxidant generated and available for oxidizing and treating the water in the pH and oxidant adjustment tank 96.

As shown in FIG. 1, the oxidant generator assembly is a chlorine generator assembly 104, utilized to generate byproduct of caustic and acid solutions for storage in tanks 106 and 108, respectively, as well as chlorine gas as the oxidant, as will be hereinafter more particularly described. Of course, the oxidant generator assembly may be either a chlorine or ozone ($O_3$) generator for providing oxidant to tank 96. If an ozone ($O_3$) generator is utilized, the caustic and acid solutions could conveniently be supplied from separate bottles or tanks of the needed solution.

The oxidant is delivered to tank 96 by means of water from the final polishing pond 100, which is pumped through pipe 141 by pump 142 to a conventional aspirator assembly 165, where the oxidant is dissolved in the water and then transferred through pipe 143 to tank 96. The oxidant is delivered to aspirator 165 through pipe 157 and valve 158. The output of the pH and oxidant adjustment tank 96 is discharged through pipe 98 to the final polishing pond 100 where the oxidant continues to act on the water and provide it with some residual oxidation. Treated water from the final polishing pond is discharged through pipe 102 from pond 100 for reuse or for disposal. If an ozone ($O_3$) generator is utilized, the water from pond 100 would be routed to the oxidant generator assembly 104 where the oxidant would be dissolved in the water using an aspirator 165 or a similar apparatus to dissolve the oxidant in the water and return to pH and oxidant adjustment tank 96.

As may be seen in FIG. 9, the electrical control circuit derives its AC power input from a 220-volt source 208, controlled by master switch 210, and thence distributed via conductors 209 and 211 to the four control circuits. Of course, as hereinabove mentioned with regard to FIG. 1, if additional combinations of electrode tank assemblies and floc settling tanks are necessary, additional control circuits will be necessary. Similarly, if only one electrode tank assembly and floc settling tank combination is utilized, the third control circuit shown in FIG. 9 may be eliminated.

Power to the first electrical control circuit 214 is provided via conductors 209 and 211, switch 212, and conductors 213 and 215. Similarly, AC power to the second control circuit 216 is provided via conductors 209, 211, 237 and 238, and switch 228. Power to the third control circuit is provided via conductors 209, 211, switch 256 and conductors 255 and 257, while AC power to the fourth electrical control circuit 220 is provided via conductors 209, 211, 277 and 279, and switch 278.

Referring now to FIGS. 2, 3 and 4, a perspective view, a plan view and a partial vertical cross-sectional view of a typical electrode tank assembly 40 is shown. In FIG. 2, the water from mixing tank 28 (see FIG. 1) is applied through pipe 34 to a manifold 35 and thence into one end of electrode tank 42 via pipes 31, 33 and 37 at various vertical levels. The electrodes 150 are vertically mounted and horizontally spaced, each electrode alternately having one longitudinal end spaced from the wall 41 of tank 42 to provide a labyrinth through which the treated water must pass prior to discharge into a discharge manifold 61 and thence through pipe 54 into floc settling tank 56 (see FIG. 1). In FIG. 3, solenoid valve 124 is shown as is discharge pipe 121 for discharging the floc precipitate from electrode tank 42 via pipe 121 to the floc accumulation tank 110 (see FIG. 1). The floc height sensor 44 is shown mounted in position on the wall 41 of electrode tank 42 having a light source 45A and a photoelectric cell 45B which generates a signal in proportion to the light received after the light has passed through the floc bed, thereby closing the electrical circuit as hereinbefore described. The electrode tank would most advantageously be constructed of heavy concrete sidewalls 41 (see FIG. 4) and have a number of electrodes 150 typically made of carbon, aluminum, iron, zinc, lead or combinations of these as required for treating the water and creating and generating the requisite mineralized floc precipitate. Of course, many other electrode materials may be utilized, depending on the minerals, colloidal particles and other pollutants in the water to be treated. To handle large volumes of waste water daily, as would be common in many industries, large electrode tanks would be required, probably built as huge concrete tanks in the ground.

The electrode tank assembly 40 is shown having mounted thereon a foam paddle assembly 46 (see FIG. 2). The paddle assembly comprises a plurality of longitudinal paddle frames 146 having attached the length of one longitudinal edge a resilient paddle wiper 148. The ends of paddle frame 146 are attached to a pair of spaced apart chains 151 that carry the paddles longitudinally across the top of electrode tank 42, and maintain the paddle wiper 148 in direct contact with the upper edge of electrodes 150. Paddle wiper 148 is made of an insulated material such as rubber, polyurethane, polyethylene or similar materials which will not conduct electricity. Chains 151 are each driven by a pair of sprockets 152, the sprockets for each respective chain being attached to opposite ends of a drive shaft 153 and an idler shaft 154. Also attached to drive shaft 153 is a drive sprocket 155 which is driven via a chain 156 by any conventional driving means, such as an electrical or gasoline motor. The paddle assembly 46 is supported above the tank 42 by means of a structural frame 43.

As shown in FIG. 4, the treated water 147 passing through the labyrinth of electrodes 150 within electrode tank 42 contains colloidal material suspended within the water because of the small difference in specific gravity of the particles and the surrounding water. These particles are uniformly electrically charged, and many colloidal materials, including proteins, starches, celluloses, polypeptides and other substances possess negative charges. Other colloids are positively charged. These colloidal particles can be removed by electrically disturbing their charge and causing them to coalesce. The manner of disturbing the electrostatic stability of the colloidal particles is accomplished by the process of electrolysis, i.e., passing a direct current between electrode pairs through the water to be treated. The electrodes used for this purpose can be of any of the materials previously described.

As electrical current passes between the electrodes, the particles coalesce and the colloidal particle size becomes larger and larger until they are sufficiently large enough to trap bubbles of oxygen and hydrogen that are being evolved and released at the electrodes. These bubbles float the particles to the surface of the water as foam 149 (see FIG. 4). The foam 149 rises and projects above the top surface of the adjacent electrode pairs 150. The moving paddles 146, having a flexible wiper 148 in contact with the top surface of electrodes 150, sweep the foam 149 from the top surface of the electrodes and across lip 49 and onto the ramp 48. The foam deposited on the downwardly slanting surface of ramp 48 slides by gravity onto the moving surface of conveying means 50 for transporting the foam to disposal means 52 (see FIG. 1). Conveying means 50 may be any convenient conveyor or belt system, or a chute downwardly slanting from the electrode tank 42 to the disposal means 52.

As hereinabove described, the foam from most waste water will be made up of organic material and can be burned or dried for recovery of valuable minerals and other usable by-products stored for future disposal.

Demineralization and demetalization of the treated water can also be accomplished at the same time that the colloidal organic material is being removed by the foaming action during the electrolysis of the water. The electrolysis process that causes the colloidal material to coalesce, generates floc material 145 according to the specific electrode material being used and precipitates dissolved minerals and metals that can cause water hardness, and may also be used to produce ions to kill bacteria, algae and the like. Electrode materials can be selected to do specific jobs. Aluminum and carbon may be selected to remove temporary hardness; zinc electrodes may be used to reduce water toxicity, kill viruses and reduce the floc precipitate settling time. Iron electrodes may be used if the water contains sulfides. The floc precipitate 145 settles to the bottom of tank 42 and forms a floc bed which increases in depth until discharged as hereinabove described.

As mentioned above, bubbles of oxygen and hydrogen are being evolved at the electrodes and are used to help generate the colloidal foam. The bubble size and quantity can be controlled by adjusting the current used in the electrolysis process. The oxygen will oxidize some of the organic material present in the water to be treated. The oxygen and hydrogen bubbles are both beneficial, as hereinabove mentioned, in helping float coalesced material to the surface for removal. If there are chloride ions present in the water, free chlorine gas bubbles are generated, and they also will oxidize some of the organic material as well as help float coalesced material to the surface. If carbon is used for at least some of the electrodes, carbon dioxide gas bubbles are generated which will help control the pH as well as convert carbonates present in the water to the more soluble bicarbonates.

The use of aluminum electrodes will produce aluminum ions, which in the hydroxide form are very beneficial in forming floc 145 and precipitating hardness minerals. The use of some zinc or lead electrodes will give added weight to the aluminum floc particles and aid in a more rapid settling of the floc precipitate. Zinc ions are a biocide used for destroying bacteria and viruses as hereinbefore mentioned. The use of iron electrodes provides a very inexpensive electrode material which is beneficial in removing finely disseminated organic material from water. Different electrodes may be used to provide specific ions needed for treatment of a combination of specific contaminants present in the polluted waste water.

Referring now to FIGS. 1 and 9, the electrical power needed by electrode tank assemblies 40 and 70 is controlled by control circuits 216 and 218. The electrodes 150 of electrode tank assembly 40 receive a varying DC voltage dependent upon the water flow rate and volume, the color as measured by flow meter 36 and color meter 38, the electrical signal outputs of which are applied to circuit 216 via conductors 248 and 247, respectively. As will hereinafter be more fully explained, the second control circuit 216, in response to the signals from flow meter 36 and color meter 38, controls motor 222 via conductor 244 for operating variable transformer 226. AC power is applied to the primary winding 232 via conductors 209, 211, 235 and 236 and switch 230. Motor 222 mechanically varies the coupling between primary winding 232 and the secondary winding 234 of transformer 226 to control the AC voltage applied via conductors 239 and 240 to the DC rectifier 224. The variable output of rectifier 224 is applied to electrodes 150 of the first electrode tank assembly 40 via conductors 241 and 242 for accomplishing the electrolysis process. The greater the flow of water and the darker the color of the water entering tank assembly 40, the greater will be the DC voltage applied to the electrodes via conductors 241 and 242.

Similarly, control circuit 218 responds to the measurements of flow rate and volume by flow meter 36, color by color meter 62 and resistivity by resistivity meter 64, applied as signal inputs via conductors 248, 270 and 271, respectively, and controls the operation of motor 258 and hence the operation of variable transformer 260. The secondary winding 264 is connected to the DC rectifier 267 by conductors 265 and 266. The coupling between the primary and secondary windings of transformer 260 may be mechanically varied by operation of motor 258, thus varying the AC voltage induced in the secondary winding 264. The variable AC voltage, applied to rectifier 267 produces a variable DC voltage for application to electrode tank assembly 70 via conductors 268 and 269, as conditions require more or less voltage to accomplish the electrolysis process.

Figure 5:
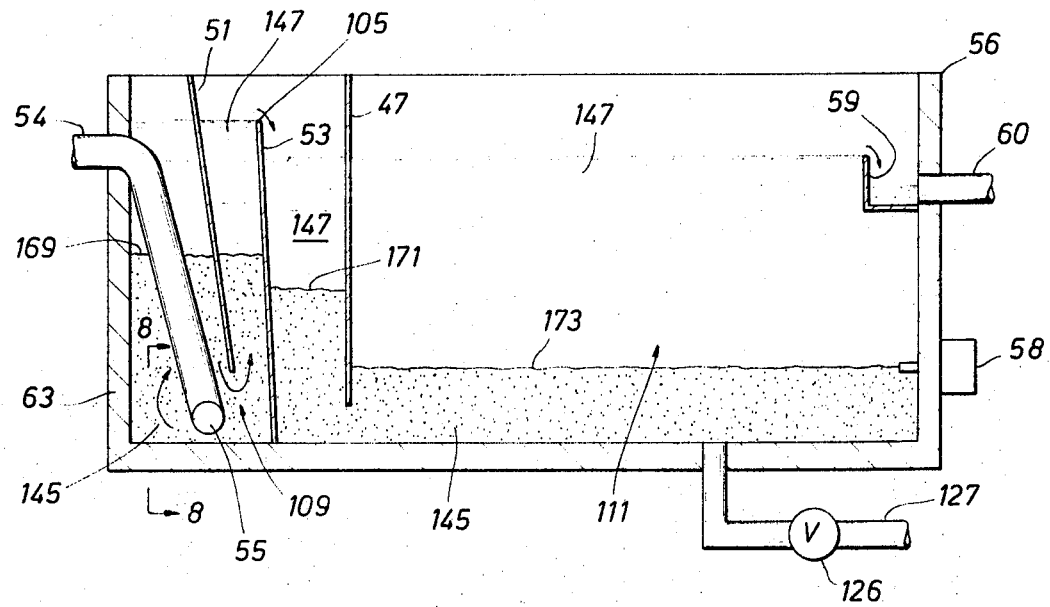
FIG. 5 is a detailed vertical cross-sectional view of a floc settling tank shown in FIG. 1.
Figure 8:
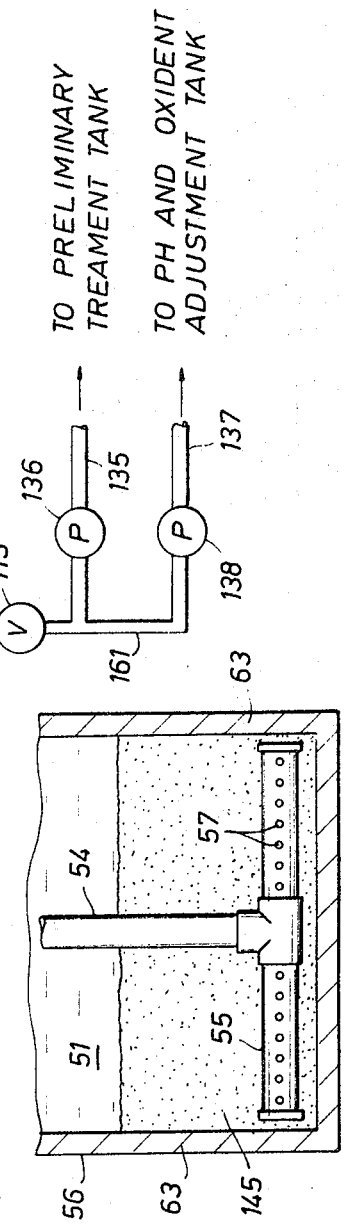
FIG. 8 is an enlarged fragmentary detailed view of the T-head pipe assembly for introducing the waste water into the preliminary treatment tank.

Referring now to FIGS. 1, 5 and 8, the floc settling tank, similar to the electrode tank 42, hereinbefore discussed, would advantageously be constructed having concrete walls 63 for handling large volumes of water typical of industrial application. As was hereinbefore mentioned, it is critical that some of the floc in the electrode tank 42 be transmitted through pipe 54 into the floc settling tank 56 as a seeding floc. This is necessary in order that a continuous supply of floc be available in settling tank 56 for causing a continuous floc precipitation 145 in the tank. Pipe 54 enters tank 56 at an inclined angle and terminates in a T-shaped head 55, having a series of spaced holes 57 facing the back wall 63 of tank 56 (see FIGS. 5 and 8). Pipe 54 is inclined at an angle so that the floc transmitted with the treated water from electrode tank 42 will gently slide down the inclined surface inside of pipe 54 and be circulated into the first chamber 109 of tank 56 (see FIG. 5).

Tank 56 is separated into first and second chambers, 109 and 111, respectively, by means of a partition plate 53 disposed laterally across tank 56. It will be noted that plate 53 is not vertical but slants slightly toward the first chamber 109 in order that any floc carried by the treated water 147, as it rises in the first chamber and spills over the top lip 105 of plate 53, will gently slide down the inclined surface of plate 53 into the space between plates 53 and 47. Plate 47 is a vertical partition plate spaced longitudinally from plate 53 and disposed laterally between the opposite sides of tank 56. However, plate 47 does not touch the bottom of tank 56 and allows the treated water 147 and floc precipitate 145 to pass under the bottom edge of plate 47 into the larger area of the second chamber 111. Also disposed in chamber 109 is a lateral plate 51 spaced behind separation plate 53 and is slanted at an angle, as shown in FIG. 5, to help circulate the water and floc precipitate 145 flowing through holes 57 in the head 55 upwardly and then downwardly and around the bottom edge of plate 51 and upwardly into the space between plates 51 and 53.

The floc precipitate level in the first chamber 109 will rise to approximately the level shown at 169, depending on the quantity and flow rate of water being treated. The floc precipitate level 171 between plates 47 and 53 will be slightly lower than the floc precipitate level in the first chamber 109, since a smaller quantity of floc material is escaping over the top edge 105 of plate 53. The floc level within the main portion of the second chamber 111 of the floc settling tank 56 will build to a height approximately shown at 173 where the floc level will be monitored by the floc height sensor 58, functioning identically to the floc height sensor 44, hereinbefore described with respect to electrode tank 42. When the floc precipitate 145 reaches a predetermined level, the floc height sensor 58 signals the second control circuit (see FIG. 9) and solenoid valve 126 is in turn energized, thereby opening valve 126 and allowing floc precipitate 145 to discharge from the interior of the second chamber 111 through pipes 127 and 123 to the floc accumulation tank 110 as hereinabove described.

The treated water 147 rises within the interior of settling tank 56 until it spills over the upper edge of the laterally disposed weir 59 at the end of the settling tank opposite input pipe 54. The water that spills into weir 59 contains very little or no floc precipitate compared to the water injected via pipe 54. The treated water in weir 59 is discharged through pipe 60 to the input of another electrode tank assembly, if another electrode tank assembly is required, as hereinabove discussed.

If an additional electrode tank assembly 70 and settling tank 84 are needed, as illustrated in FIG. 1, and previously described, electrode tank assembly 70 and settling tank 84 would be constructed and function identically to electrode tank assembly 40 and settling tank 56, respectively. Of course, if additional electrode tanks or settling tanks are required, they would also function in the same manner as electrode tank assembly 40 and settling tank 56. As hereinbefore described in the detailed discussion of electrode tank assembly 40, each successive electrode tank, if needed, may utilize a different combination of electrode materials, depending on the pollutants in the water and the necessary action desired on organic and inorganic substances present.

Figure 7:
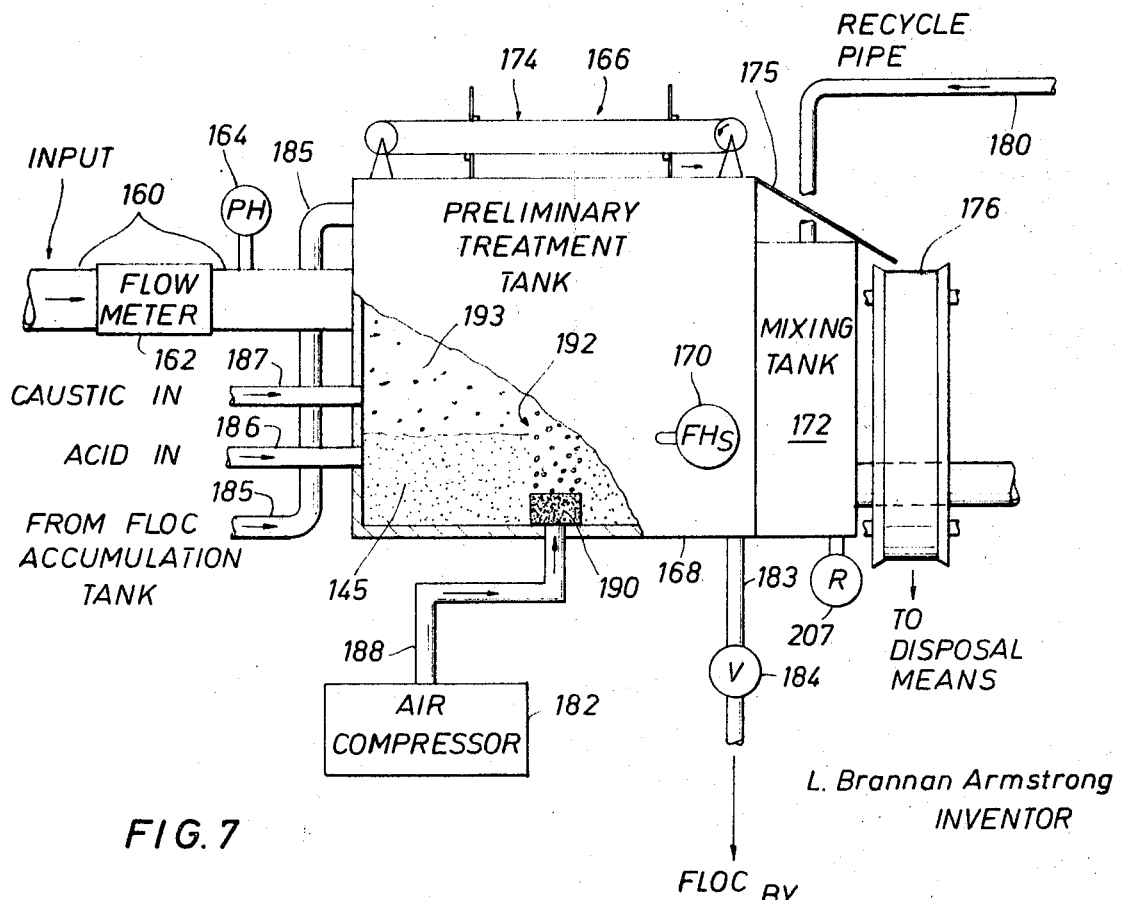
FIG. 7 is a partial fragmentary detailed view of an embodiment of a preliminary treatment tank assembly having a paddle assembly and a means for aerating the waste water in the preliminary treatment tank.

As described above, the polluted waste water is first emptied into a preliminary treatment tank 26 (see FIG. 1) for initial pH adjustment and initial floc seeding to precipitate a first quantity of mineralized and organic material from the water. In addition to the above-mentioned preliminary treatment, some polluted waters require a primary foaming treatment. This foaming treatment may be provided for in a second embodiment of the preliminary tank assembly 166, as shown in FIG. 7. Preliminary treatment tank 168 receives water input through a pipe 160 and a flow meter 162. The flow meter 162 is identical to the flow meters hereinabove described as used in the system shown in FIG. 1. A pH meter 164 determines the initial pH of the water for application of appropriate caustic or acid solutions through pipes 187 or 186 as required. Seeding floc from a floc accumulation tank such as the tank 110 shown in FIG. 1, will be applied directly to the preliminary treatment tank 168 by means of a pipe 185. An air compressor 182 introduces compressed air through tubing 188 to the bottom of tank 168 through a porous block material 190 to break up the airstream into many tiny bubbles and create a bubble curtain 192, which assists in floating materials to the surface where these materials, and any floating trash, are removed by paddle assembly 174.

The seeding floc injected through pipe 185 precipitates a certain quantity of mineral and organic materials from the water 193 to form a floc precipitate 145 shown in the bottom of tank 168. The level of the floc precipitate will be monitored by means of a floc height sensor 170, whose operation is identical to the floc height sensors hereinbefore described for use with the apparatus described in FIG. 1. When the floc precipitate 145 reaches a predetermined level, floc height sensor 170 would cause the first control circuit 214 to actuate solenoid valve 184 for discharging some of the floc precipitate via pipe 183 to a disposal means (not shown) in the identical manner hereinabove described for preliminary treatment tank 26. Similarly, the resistivity of the water in mixing tank 172 would be monitored by resistivity meter 207, identical to resistivity meter 32 previously described, and would cause the recycling of water from the output of the first settling tank 56 via pipe 180 to the mixing tank for increasing the resistivity of the water as hereinbefore explained. The output of mixing tank 172 is discharged through pipe 178 to the input of the first electrode tank assembly 40 as hereinabove described for preliminary treatment tank 26 (see FIG. 1). In FIG. 9 it may be seen that air compressor 182 is actuated by means of an electrical signal applied via conductor 221.

The paddle assembly 174 is identical to the paddle assembly hereinabove described for the electrode tank assemblies 40 and 70 and sweeps any foam, floating materials and trash from the surface of the treated water in the preliminary treatment tank 168 where it is deposited on the ramp 175. The material slides down ramp 175 to a conveying means 176 for transporting to a suitable disposal means, such as disposal means 52 hereinabove described.

Figure 6:
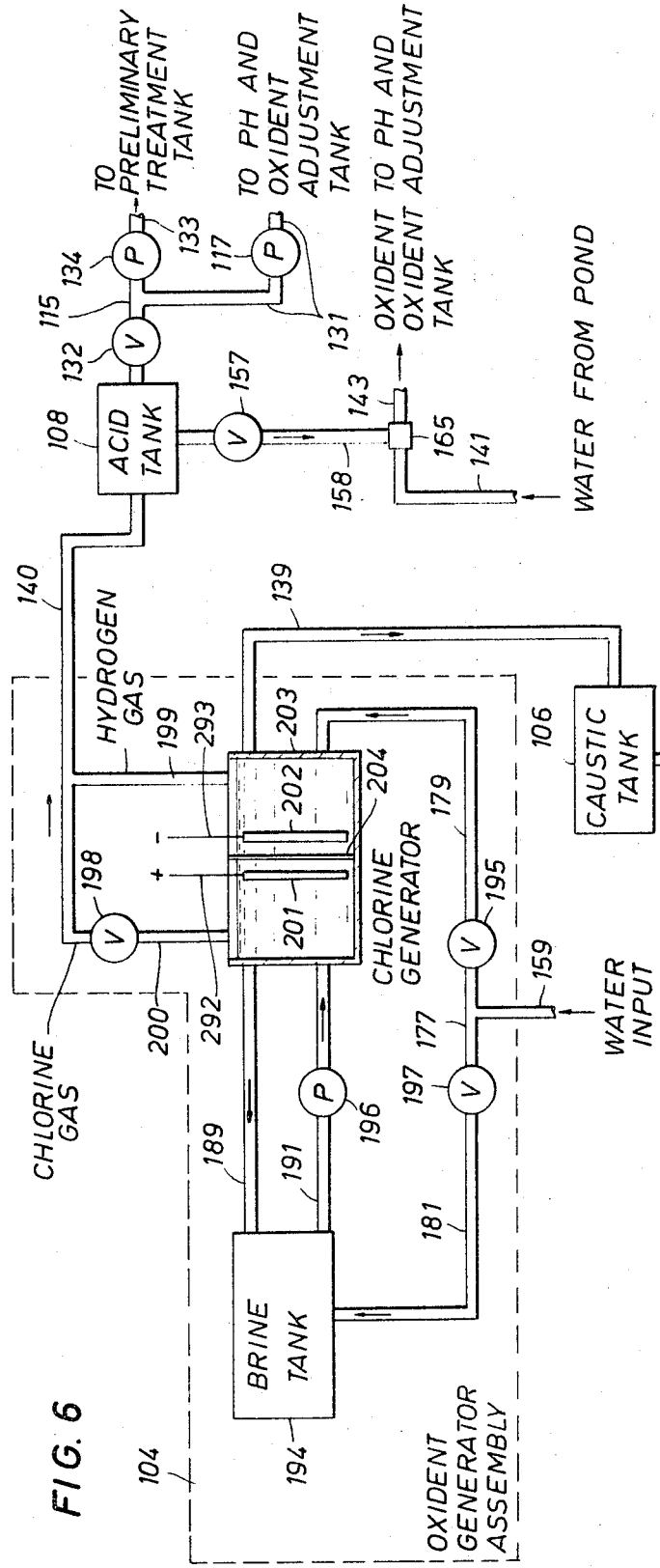
FIG. 6 is a detailed mechanical schematic of one embodiment of the oxidant generator assembly shown in FIG. 1.

As hereinbefore described for the system shown in FIG. 1, a separate oxidant generator assembly 104 may be utilized for generating and applying an oxidant to the pH and oxidant adjustment tank 96. Separate caustic and acid tanks 106 and 108 may be utilized for supplying the appropriate caustic or acid solution in the various treatment tanks for adjusting the pH of the water at various stages. However, the oxidant generator assembly 104 may be a chlorine generator assembly as shown in FIG. 6, whereby caustic and acid solutions will be generated during the generation of the oxidant itself, thereby assuring a continuous supply of oxidant and caustic and acid solutions. The oxidant generator assembly 104, shown in FIG. 6, employs a sealed tank 203 separated by a semipermeable membrane 204 for forming two chambers. An electrode 201 is disposed in one chamber and an electrode 202 is disposed in the other chamber, separated by the semipermeable membrane. Electrodes 201 and 202 receive DC potentials from DC rectifier 284 via conductors 292 and 293, respectively (see FIG. 9).

A positive electrical potential is applied to electrode 201, while a negative electrical potential is applied to electrode 202 of the chlorine generator. Brine from tank 194 is circulated through pipes 191 and 189 by pump 196 into the chamber containing the electrode 201. With the potentials applied to the electrodes, a direct current passes between the electrodes through the brine solution, and chlorine gas is evolved at the positive electrode 201, bubbles up through the brine solution and into pipe 200, passes through valve 198 and into distribution pipe 140. Simultaneously, free hydrogen gas is being evolved at the negative electrode 202, bubbles up through the solution and into pipe 199 and thence into pipe 140. Sodium is also produced at the negative electrode and immediately combines with water to form sodium hydroxide and is discharged through pipe 139 to caustic tank 106 for use in adjusting the pH of the treated water. The chlorine gas contains some water vapor and when combined with the hydrogen gas forms a hydrochloric acid solution in acid tank 108, for use in pH adjustment as hereinbefore described. In addition, free chlorine gas present in acid tank 108 passes through valve 157 and pipe 158 to be dissolved in water pumped from the polishing pond through pipe 141 and 143 (see FIG. 1) to the pH and oxidant adjustment tank 96. The chlorine may effectively be dissolved in the water by means of a conventional aspirator 165.

Fresh water is supplied to oxidant generator assembly 104 through pipe 159 (see FIGS. 1 and 6) for use in controlling the fluid levels of brine tank 194 and the chamber containing the negative electrode 202. Water through pipe 159 passes through pipes 177 and 181 and valve 197 to brine tank 194, and through pipes 177 and 179 and valve 195 to the negative electrode compartment.

If ozone ($O_3$) is required as an oxidant, it may be produced by utilizing an $O_3$ generator using a high voltage alternating current impressed across opposing electrodes having air as an electrolyte. The $O_3$ oxidant would then be dissolved in the water from the polishing pond via pipes 141 and 143 and aspirator 165, previously described, and distributed to the pH and oxidant adjustment tank 96.

The output of the acid tank 108, shown in FIG. 6, is applied through valve 132 and pipes 115 and 133 by pump 134 to the preliminary treatment tank, and through pipes 115 and 131 by means of pump 117 to the pH and oxidant adjustment tank 96 as hereinabove described. Similarly, the output of caustic tank 106 is applied through valve 113 and pipes 161 and 135 by pump 136 to the preliminary treatment tank and through pipes 161 and 137 by pump 138 to the pH oxidant adjustment tank 96 as hereinabove described.

Figure 10:
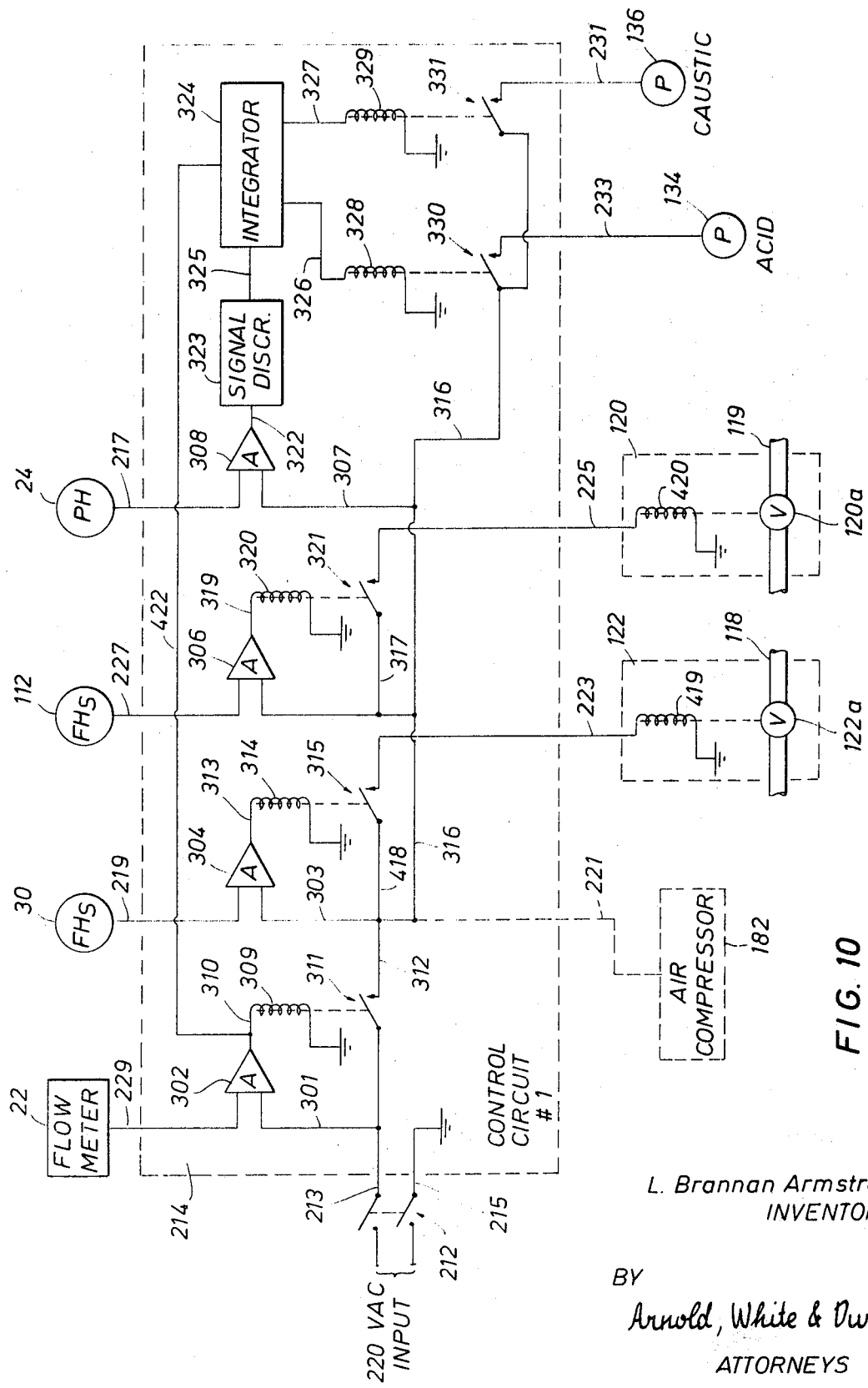
FIG. 10 is a detailed schematic diagram of the first control circuit shown in FIG. 9.
Figure 11:
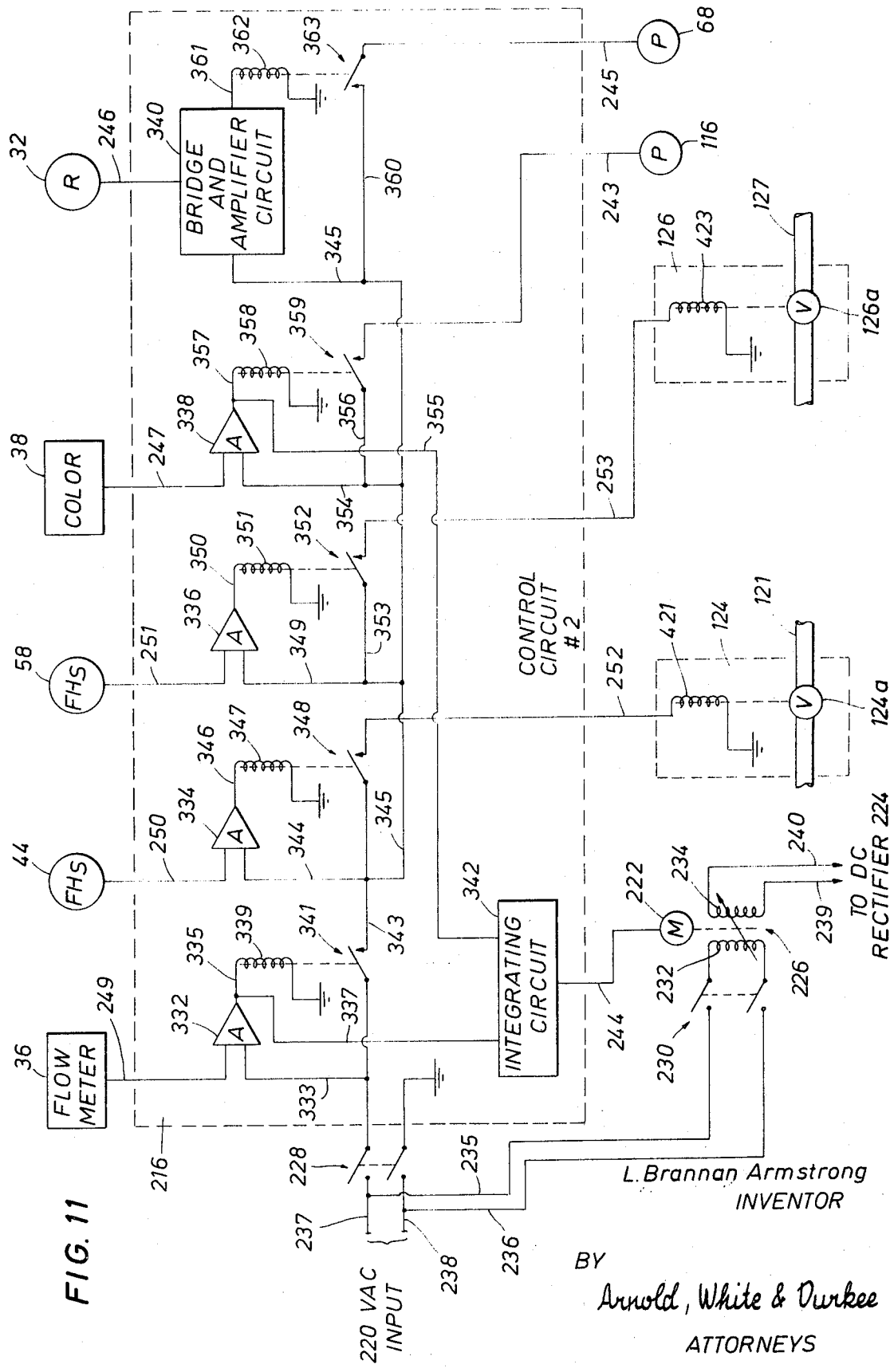
FIG. 11 is a detailed schematic diagram of the second control circuit shown in FIG. 9.

Referring now to FIGS. 9 through 13, the electrical control circuit of the water pollution control system will be described in greater detail. A detailed schematic of the first control circuit 214 is shown in FIG. 10. The 220-volt AC supply line voltage applied via conductors 209 and 211 is applied via conductors 213 and 215 and switch 212 as an input to the control circuit. The electrical signal output of flow meter 22 is applied via conductor 229 as one input to amplifier 302. When switch 212 is closed, AC power is applied via conductor 301 to amplifier 302, and if a flow meter signal is received via conductor 229, the amplifier 302 generates an electrical voltage applied via conductor 310 to the relay coil 309 for closing relay contacts 311. When relay contacts 311 are closed, 220-volt AC power is applied to the remainder of control circuit 214. The output of amplifier 302 is also applied via conductor 422 as an input to a conventional integrating circuit 324.

Electrical power through the closed relay contacts 311 is applied via conductors 312 and 303 to amplifier 304, via conductors 312, 316 and 305 to amplifier 306, and via conductors 312, 316 and 307 to amplifier 308. The signal from the photocell of floc height sensor 30 is applied via conductor 219 to amplifier 304 and then applied via conductor 313 to relay coil 314, normally energized with relay contacts 315 open. When the electrical signal from photocell 45B of floc height sensor drops below a predetermined value, indicating the maximum height of the floc bed, relay coil 314 is deenergized, thus closing relay contact 315. The closing of contacts 315 applies 220-volt AC power via conductors 312, 418 and 223 to relay coil 419 of solenoid valve 122. Energization of the relay coil 419 operates valve 122a of solenoid valve 122 thus allowing the excess floc precipitate from the preliminary treatment tank 26 (see FIG. 1) to discharge through pipe 118 to the floc accumulation tank 110.

Similarly, an electrical signal from floc height sensor 112 of tank 10 is applied via conductor 227 to amplifier 306 which in turn produces an electrical voltage applied via conductor 319 to energize relay coil 320 and maintain relay contacts 321 in a normally open condition. When the proper floc height in tank 110 is reached, the signal drops below a predetermined value, coil 320 is deenergized and relay contacts 321 are closed. The closing of relay contacts 321 applies 220-volt AC power via conductors 312, 316, 305, 317 and 225 to relay coil 420 of solenoid valve 120. Energization of relay coil 420 operates valve 120a and allows excess floc precipitate in the floc accumulation tank 110 (see FIG. 1) to be discharged through pipe 119.

The pH meter, or glass electrode 24, disposed in pipe 20 for reading the pH of the polluted waste water prior to its entry into the preliminary treatment tank 26 (see FIG. 1) generates an electrical signal applied via conductor 217 to amplifier 308. The output of amplifier 308 is applied via conductor 322 as input to a signal discriminator circuit 323. The signal discriminator 323 is a conventional discriminating circuit for discriminating between signals above or below a given output level from amplifier 308, denoting the pH level of the water. The output of the discriminator is applied via conductor 325 to a conventional integrator circuit 324. Integration of signals from amplifiers 302 and 308 by circuit 324 produces an output at either conductor 326 or 327, depending on whether the pH of the treated water needs an acid or caustic solution added to adjust the pH to a more neutral level, commonly between 5.0 and 5.5. If additional acid must be added to the preliminary treatment tank 26, a signal will be generated by integrator 324 and applied via conductor 326 to the relay coil 328. With relay coil 328 energized, relay contacts 330 are closed and electrical power is applied via conductors 312, 316 and 233 to the acid pump 134. On the other hand, if caustic needs to be added to the water in the preliminary treatment tank 26 (see FIG. 1) the integrator 324 will produce an electrical signal applied via conductor 327 to relay coil 329. With coil 329 energized, relay contacts 331 close, and electrical power is applied via conductors 312, 316, 318 and 231 to energize caustic pump 136. With the addition of the acid or caustic solution the pH of the water changes, thus varying the electrical signal applied via conductor 217 from pH meter 24. When the pH has reached the desired level, the integrator 324 output will reach a preset level, thus deenergizing coils 328 or 329 and opening the closed contacts 330 or 331 to shut off the appropriate acid or caustic pump 134 or 136.

If an air compressor 182 is utilized as shown in the embodiment described above in FIG. 7, electrical power to the air compressor will be applied via conductors 312 and 221 immediately upon the energization of relay coil 309 and the closing of relay contacts 311 when flow meter 22 indicates the passage of water through pipe 20 (see FIG. 1). It should be noted that when water movement through flow meter 22 drops to a level such that no electrical signals are produced and applied via conductor 229 to amplifier 302, relay coil 309 will be deenergized thus opening relay contacts 311 and disabling the remaining circuitry of the first control circuit.

Referring now to FIGS. 1, 9 and 11, 220-volt AC power is applied to the second control circuit via conductors 237 and 238, switch 228 and conductor 333 to amplifier 332. When flow meter 37, disposed in pipe 34 between mixing tank 28 and the first electrode tank assembly 40 (see FIG. 1), is actuated by the flow of water in pipe 34, electrical signals are generated and applied via conductor 249 to amplifier 332. The signal level output of amplifier 332 is applied via conductor 335 to the relay coil 339, and via conductor 337 as one input to integrating circuit 342. Upon energization of relay coil 339, relay contacts 341 are closed thereby enabling the remainder of the circuitry of control circuit 216 and applying 220-volt AC power via conductor 237, closed contacts 341, conductors 343 and 344 to amplifier 334, via conductors 343, 345 and 349 to amplifier 336, via conductors 343, 345 and 354 to amplifier 338, and via conductors 343 and 345 as an input to bridge and amplifier circuit 340.

The floc height sensor 44 monitoring the height of the floc precipitate in the first electrode tank assembly 40 (see FIG. 1) generates an electrical signal applied via conductor 250 to amplifier 334. The output of amplifier 334 is applied via conductor 346 to relay coil 347, which when energized maintains relay contacts 348 open. As previously described for floc height sensors 30 and 112 (see FIG. 10), when the floc height reaches the maximum limit, relay coil 347 is deenergized, closing contacts 348. This action applies AC power via conductors 343, closed relay contacts 348, and conductor 252 to relay coil 421 of solenoid valve 124. When relay coil 421 is energized, valve 124a is actuated to the open position, and allows floc precipitate in the bottom of electrode tank 42 to be discharged through pipe 121 to the floc accumulating tank 110 as hereinabove described.

Similarly, the floc height sensor 58 of the first floc settling tank 56 applies electrical signals via conductor 251 to amplifier 336. The amplified output of 336 is applied via conductor 350 to relay coil 351, which when deenergized (when the predetermined floc height is reached) closes relay contact 352 and applies AC power via conductors 343, 345, 349, 353 and 253 to relay coil 423 of solenoid valve 126. The energization of relay coil 423 actuates valve 126a to the open position and allows the discharge of accumulated floc precipitate in the bottom of floc settling tank 56 through pipe 127 as hereinabove described.

The electrical signal output of color meter 38 is applied via conductor 247 to amplifier 338. The amplified output of amplifier 338 is applied via conductor 357 to relay coil 358 for closing relay contacts 359 and applying electrical power via conductors 343, 345, 354, 356 and 243 to pump 116 for pumping seeding floc from tank 110 through pipe 114 to the preliminary treatment tank 26 (see FIG. 1) as hereinabove described. The output of amplifier 338 is also applied via conductor 355 as a second input to a conventional integrating circuit 342. The electrical signal generated by resistivity meter 32 is applied via conductor 246 to a conventional bridge and amplifier circuit 340. The bridge circuit utilizes a standard Wheatstone bridge circuit and conventional amplifier. The output of bridge and amplifier circuit 340 is applied via conductor 361 to coil 362 for closing relay contacts 363 and providing electrical power via conductors 343, 345, 360 and 245 to pump 68 for recycling treated water discharged at the output 60 of the first floc settling tank 56 through pipe 66 back to the mixing tank 28 as shown in FIG. 1.

Integrating circuit 342 is a conventional integrating circuit for integrating the amplified flow meter signal applied via conductor 337 and the amplified color meter signal applied via conductor 355 to produce an electrical signal output 244 for driving motor 222 controlling a variable transformer 226. 220-volt AC power is applied via conductors 235 and 236 through switch 230 to the primary winding 232 of variable transformer 226. The secondary winding 234 applies a variable AC voltage via conductors 239 and 240 to the DC rectifier 224 shown in FIG. 9, for the purposes hereinbefore described. Motor 222 mechanically changes the coupling between the primary and secondary windings, 232 and 234, respectively, of variable transformer 226 for varying the AC voltage applied to the DC rectifier 224 in response to the integrated flow rate and color signals provided by flow meter 36 and color meter 38.

Figure 12:
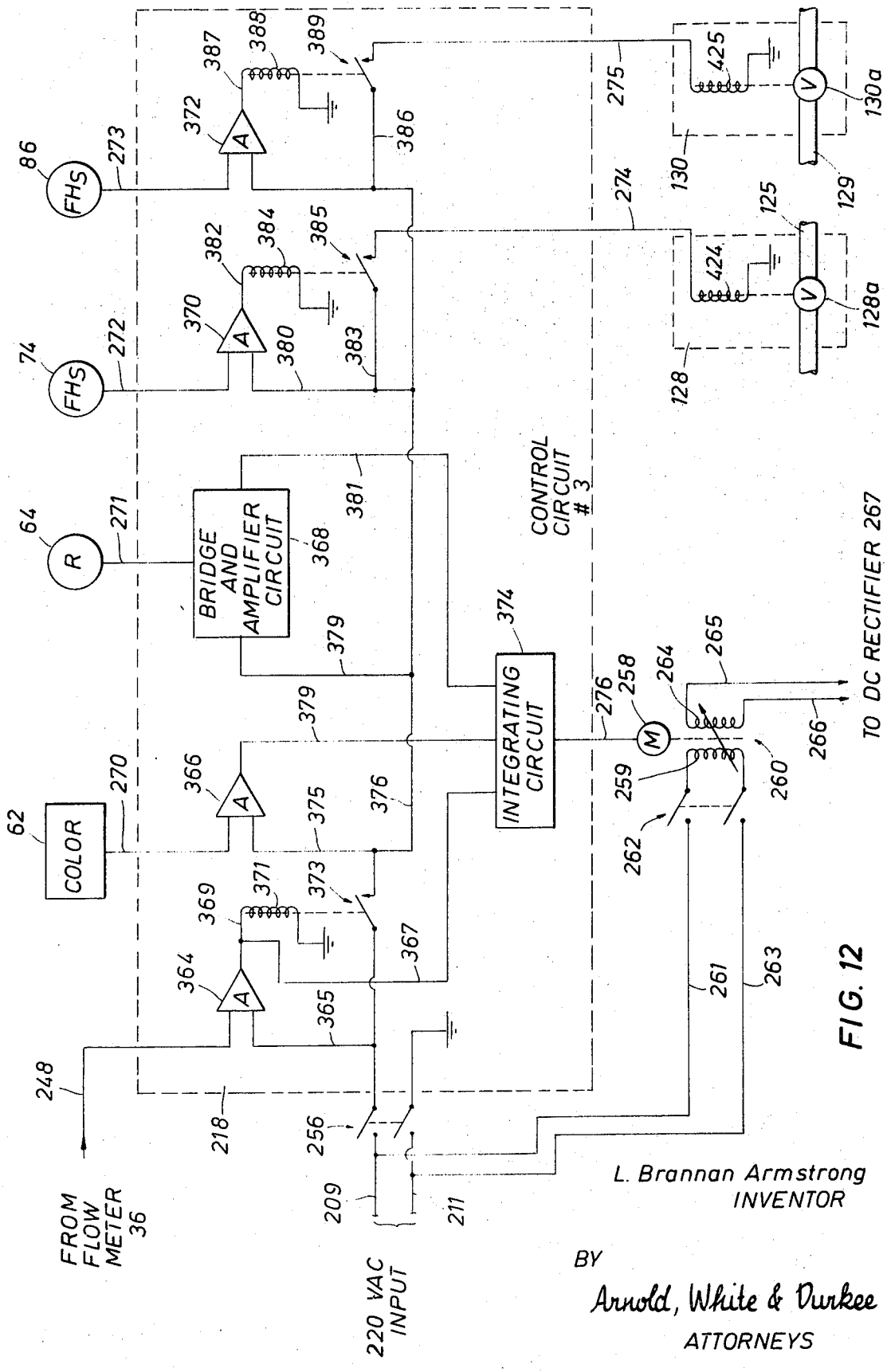
FIG. 12 is a detailed schematic diagram of the third control circuit shown in FIG. 9.

Referring now to FIG. 12, 220-volt AC is applied via conductors 209 and 211 through a switch 256 as an input to the third control circuit 218. 220-volt AC power is applied via conductor 209 and 365 to amplifier 364. The electrical signals generated by flow meter 36 (see FIG. 9) are applied via conductor 248 as an input to amplifier 364. The amplified output of amplifier 364 is applied via conductor 369 to relay coil 371, and via conductor 367 as one input to an integrating circuit 374. When coil 371 is energized, relay contacts 373 close thereby energizing the remainder of the third control circuit 218.

With relay contacts 373 closed, power is applied via conductors 209 and 375 to amplifier 366, via conductors 209, 376 and 379 as an input to a conventional bridge and amplifier circuit 368, via conductors 209, 376 and 380 to amplifier 370, and via conductors 209 and 376 as an input to amplifier 372. The electrical output of color meter 62 is applied via conductor 270 to amplifier 366 whose output signal is applied via conductor 378 as a second input to integrating circuit 374. The electrical signal output of resistivity meter 64 is applied via conductor 271 to the conventional Wheatstone bridge and amplifier circuit 368. The output of the bridge and amplifier circuit 368 is applied via conductor 381 as a third input to integrating circuit 374. Integrating circuit 374 integrates the amplified flow rate, color and resistivity signals for generating an electrical signal applied via conductor 276 to motor 258 for mechanically varying the coupling between the windings of variable transformer 260. 220-volt AC power is applied via conductors 261 and 263 through switch 262 to the primary winding 259 of variable transformer 260. Secondary winding 264 applies a variable AC signal via conductors 265 and 266 to the DC rectifier 267 as hereinabove described. Motor 258 mechanically varies the coupling between the primary and secondary windings, 259 and 264, respectively, to vary the AC voltage to the DC rectifier 267 in order to vary the DC voltage produced by rectifier 267 and applied to the electrodes 150 of the electrode tank assembly 70 for the purposes hereinabove described.

Floc height sensor 74 of the second electrode tank assembly 70 operates in the identical manner hereinbefore described for the previous floc height sensors. An electrical signal is applied via conductor 272 as an input to amplifier 370, and then applied via conductor 382 to a relay coil 384, which when energized maintains relay contacts 385 in an open position. When the proper floc bed depth is reached, coil 384 is deenergized, closing relay contacts 385 and applying AC power via conductors 209, 376, 383 and 274 to relay coil 424 of solenoid valve 128. Upon energization of relay coil 424, valve 128a is actuated to allow floc precipitate in the bottom of electrode tank 72 to be discharged through pipe 125. Similarly, when the floc height sensor 86 of the second floc settling tank 84 is actuated, an electrical signal is applied via conductor 273 to amplifier 372, whose output is applied via conductor 387 to a relay coil 388. Energization of relay coil 388 maintains relay contacts 389 in an open condition until the proper floc bed height is reached, whereupon coil 388 is deenergized and applies AC power via conductors 209, 376, 386, and 275 to relay coil 425 of solenoid valve 130. Relay coil 425 actuates valve 130a to allow disposal of a portion of the floc precipitate in floc settling tank 84 through pipe 129 to the floc accumulation tank 110 as hereinabove described.

Figure 13:
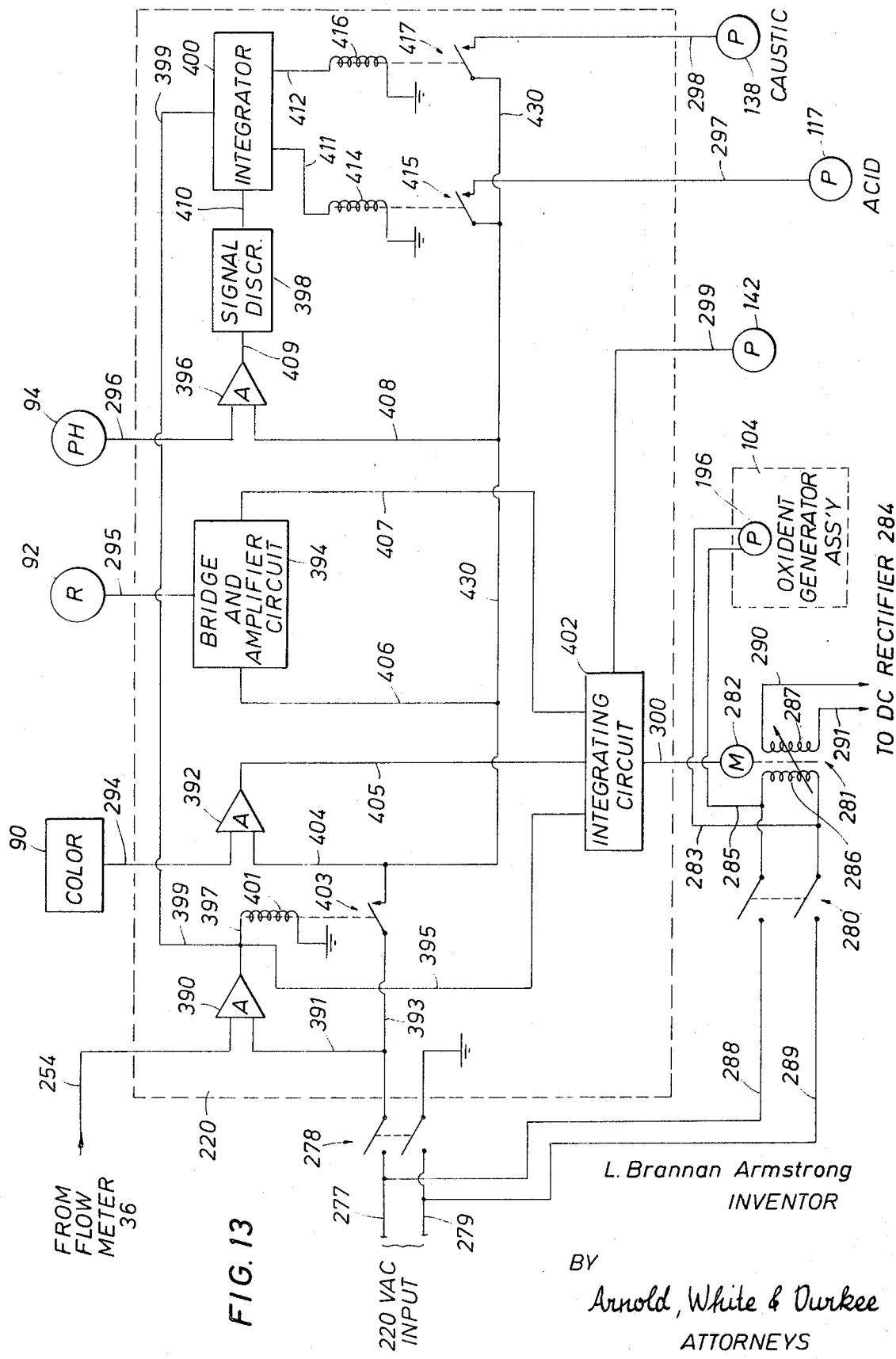
FIG. 13 is a detailed schematic view of the fourth control circuit shown in FIG. 9.

FIG. 13 is a schematic of the fourth control circuit showing 220 volts AC applied via conductor 277 and 279 and through switch 278 as an input to the control circuit 220. The AC power is applied through switch 278 via conductors 277 and 391 to amplifier 390. Electrical signals from flow meter 36 (see FIG. 1) are applied via conductor 254 (see FIG. 9) as a second input to amplifier 390. The output of amplifier 390 is applied via conductor 397 to the relay coil 401, which when energized closes contacts 403 and applies electrical power via conductor 277, switch 278, conductor 393, closed contacts 403 and conductor 404 to amplifier 392, and via the closed contacts 403 and conductors 430 and 406 to a conventional bridge and amplifier circuit 394. Electrical power is also applied through the closed contacts 403 via conductors 430 and 408 to amplifier 396 and via conductor 430 to open relay contacts 415 and 417. The output of amplifier 390 is also applied via conductor 399 as an input to a first conventional integrator circuit 400 and via conductor 395 to a second conventional integrating circuit 402. The electrical signal output of color meter 90 is applied via conductor 294 to amplifier 392 whose output is applied via conductor 405 as a second input to integrating circuit 402.

The electrical signal output generated by the resistivity meter 92 is applied via conductor 295 as an input to the conventional Wheatstone bridge and amplifier circuit 394, the output of which is applied via conductor 407 to integrating circuit 402 as a third input. The amplified signals representing the flow rate of the water, the color of the water, and the resistivity of the water are integrated by the conventional integrating circuit 402 and produce an output signal applied via conductor 300 to motor 282. Motor 282 mechanically varies the coupling between the primary and the secondary windings, 286 and 287, respectively, of variable transformer 281 for applying a variable AC voltage to DC rectifier 284 for controlling the electrical power applied to the oxidant generator assembly 104 (see FIG. 9) depending on the oxidant demands, which in turn are dependent upon the flow rate, the color and the resistivity of the treated water. AC power is applied via conductors 288 and 289 through switch 280 to the primary winding 286 of variable transformer 281, while the variable secondary AC voltage is applied via conductors 290 and 291 from secondary winding 287 to DC rectifier 284 (see FIG. 9) for the purposes hereinbefore described. In addition, AC power is applied via conductors 288 and 289, switch 280 and conductors 283 and 285 to pump 196 within the oxidant generator assembly 104 (see FIG. 6). Simultaneously with operating motor 282 via signals applied through conductor 300, integrating circuit 402 applies an electrical voltage via conductor 299 to operate pump 142 for cycling water from the finishing pond 100 to the oxidant generator assembly 104 and absorbing the desired oxidant and applying it to the pH and oxidant adjustment tank 96 as hereinabove described in the system shown in FIG. 1.

The pH meter 94, typically a conventional glass electrode device, applies an electrical signal via conductor 296 to amplifier 396. The output of amplifier 396 is applied via conductor 409 to a signal discriminator circuit 398 for detecting a signal level applied above or below a preset minimum level representing the desired pH of the treated water. The output of the conventional discriminator 398 is applied to an integrating circuit 400 via conductor 410 and is integrated with the flow meter signal from amplifier 390, applied via conductor 399, to produce an output signal at either conductor 411 or 412 from integrator 400. If the pH of the water is caustic and acid needs to be added, an output signal will appear at conductor 411 of the integrator circuit 400 and be applied to the relay coil 414, which when energized closes relay contacts 415 thereby applying voltage to the acid pump 117 via conductor 297. Pump 117 moves acid solution from acid tank 108 through pipes 115 and 131 to the pH and oxidant adjustment tank 96 as hereinbefore described (see FIG. 1). By the same token, if the pH as monitored by meter 94 is shown to be acid and a caustic needs to be added, an output will appear at conductor 412 of integrator 400 and be applied to relay coil 416. When relay coil 416 is energized, relay contacts 417 are closed thereby applying voltage via conductor 430, closed relay contacts 417 and conductor 298 to the caustic pump 138 for pumping caustic solution through pipe 137 to the pH and oxygen adjustment tank 96, as hereinabove described (see FIG. 1).

With the addition of the acid or caustic solution, the pH of the water changes, thus changing the electrical signal applied via conductor 296 from pH meter 94. When the pH has reached the desired level, the integrator 400 output will reach a preset level, thus deenergizing coils 414 or 416 and opening the closed contacts 415 or 417 to shut off the appropriate acid or caustic pump 117 or 138.

As hereinbefore mentioned, in some systems for treating polluted water, only one electrode tank assembly and floc settling tank will be necessary for full treatment of the water. On the other hand, for other installations, it may be necessary to utilize a third or fourth set of electrode tank assemblies and floc settling tanks, depending on the condition of the water and the pollutants that must be removed. Accordingly, additional control circuitry would be needed, but would function in the same manner as the control circuitry described.

Many types of polluted waters have been successfully treated utilizing the system hereinbefore described, and an example of the operation of the system on an extremely polluted combination of waters will herein be given. The polluted waste water to be treated contains black liquor effluent from a paper mill mixed in combination with house service sewage and wastes from a tannery. Since the combination of the polluted waste waters above described will contain quite a bit of ABS (alkyl-benzene-sulfonate) or "detergents," the embodiment of the preliminary treatment tank assembly as shown in FIG. 7 will be utilized in place of the preliminary treatment tank 26 shown in FIG. 1 for purposes to be hereinafter discussed.

Referring now to FIGS. 1, 7 and 9, the above described polluted waste water is applied as an input to pipe 20 through flow meter 22 into the preliminary treatment tank 168. The flow rate of the water is measured by flow meter 22 as hereinbefore described, and the pH of the waste water is measured. The particular polluted waste water described would have a very high pH (caustic) and will be adjusted to a desired pH in the range of 5.0 to 5.5 by the operation of acid pump 134 which will pump acid through pipes 186 (see FIG. 7) to the preliminary treatment tank 168 as hereinbefore described.

The air compressor 182 supplies compressed air through porous block 190 for forming a bubble curtain 192 as hereinbefore described. The bubble curtain 192 aerates the polluted water moving through it and causes excess ABS to float to the surface of the preliminary treatment tank 168 for removal by paddle assembly 174 as hereinbefore described. In addition, seeding floc from accumulation tank 110 would be applied to treatment tank 168 via pipe 185 for mixing with the polluted water 193 and causing the removal of a large quantity of colloidal material by disorienting colloidal particle polarity and physical entrapment to cause a significant floc precipitation in the preliminary treatment tank 168. Of course, when the level of the floc precipitate reaches the predetermined level as monitored by floc height sensor 170, valve 184 (see FIG. 7) would be actuated to its open position, allowing excess floc precipitate to be discharged through pipe 183 to a suitable disposal means such as disposal means 52 hereinabove described. The action of floc seeding in preliminary treatment tank for producing an initial floc precipitation reduces the load on the electrode tanks to which the water will be passed in succeeding stages.

The water now enters the mixing tank 172 (see FIG. 7) where the resistivity is measured by resistivity meter 207. If the resistivity of the water is too low, treated water which has a higher resistivity and a low quantity of suspended solids and colloidal material would be recycled via recycle supply pipe 180 from the discharge pipe of the first floc settling tank as hereinabove described. When the resistivity of the water in mixing tank 172 reaches the desired level, recycling of the water via pipe 180 to the mixing tank would discontinue until a further requirement for higher resistivity is needed. The preliminarily treated water leaving mixing tank 172 would be discharged through pipe 34 (see FIG. 1) and through flow meter 36 into the first electrode tank assembly 40, as hereinabove described.

Because of the makeup and constituency of the polluted water, the first electrode tank would be constructed having only aluminum electrodes, and control circuit 216 would adjust the output of DC rectifier 224 to provide an optimum current density of 0.015 amps/in$^2$ between the aluminum electrodes. As electrolysis takes place within the first electrode tank assembly 40, the polarity of the colloidal particles normally negative, is reversed, causing the particles to coalesce and be floated to the surface as foam by the generated hydrogen and oxygen gas bubbles as hereinbefore described. This foam would then be removed by paddle assembly 46 to a conveying means 50 for transportation to a disposal means 52 for purposes hereinbefore described.

Simultaneously while the colloidal particles are being floated to the top as foam, the aluminum ions formed during the electrolysis process begin forming floc particles which coalesce and form larger and larger floc particles until their specific gravity is greater than the water and precipitate to the bottom of the electrode tank 42 as hereinbefore described, thereby removing additional color, minerals and inorganic solids. The treated water from the first electrode tank assembly 40 plus some of the aluminum floc precipitate is discharged through pipe 54 to the first floc settling tank 56 as hereinbefore described, where additional floc precipitation is generated removing additional color and inorganic solids. Of course, if the floc precipitate level reaches the level monitored by the floc height sensors 44 and 58 in the electrode tank assembly 40 and floc settling tank 56, respectively, valves 124 and 126, respectively, will be actuated for discharging excess floc precipitate to the floc accumulation tank 110 as hereinbefore described.

The water leaving floc settling tank 56 passes through pipe 60 and is introduced into electrode tank assembly 70 having a combination of zinc, carbon, iron, aluminum and magnesium electrodes. The zinc electrodes are used to provide zinc ions as a biocide to kill bacteria and viruses. The carbon electrodes are used to produce carbon dioxide ($CO_2$) for pH adjustment and additional gas bubbles for lifting colloidal particles and floc to the surface of the electrode tank for removal by the paddle assembly 76. The iron electrodes produce iron ions which in turn generate a floc which is better for removal of protein than is aluminum floc. The aluminum electrodes generate additional aluminum ions for causing aluminum floc for more complete removal of hardness and mineralization from the water. The magnesium electrodes produce magnesium ions and precipitate silica in the water as a magnesium floc precipitate. The water treated in electrode tank assembly 70 is then discharged via pipe 82 to the second floc settling tank 84 where additional time is allowed for floc particles to settle within the tank for removing additional color, minerals and inorganic solids.

The discharge from floc settling tank 84 may be returned for industrial reuse as process water and boiler feed water directly without undergoing further pH and oxidant adjustment. However, if the water is to be discharged to a stream or river, it would be necessary to put the water through a further pH and oxidant adjustment step in order to meet federal and/or state requirements. This pH and oxidant adjustment can be accomplished by utilizing the pH and oxidant adjustment tank 96, the oxygen generator assembly 104, the final polishing pond 100 and the sources of acid and caustic solution for final adjustment of the pH of the water as hereinbefore described.

The combination of various polluted waters treated in the above example is an extremely adverse combination that will seldom occur in practice. However, the above pollution control system as hereinbefore described is able to treat the water and remove sufficient pollutants using only two electrode tank assemblies and two floc settling tanks so that the water discharged from the second floc settling tank could be immediately reused as industrial process water or as boiler feedwater without additional treatment or oxidation.

Numerous variations and modifications may obviously be made in the structures and processes herein described without departing from the present invention. Accordingly, it should be clearly understood that the forms of the invention herein described and shown in the figures of the accompanying drawings are illustrative only and are not intended to limit the scope of the invention.

What is claimed is:

1. A waste water treatment process for removing colloidal, oxygen demanding and odor causing organic materials, inorganic materials and other pollutants from the water, comprising the steps of initially measuring the pH of the waste water, initially adjusting the pH of the waste water to a predetermined value in response to said initial measurement, initially mixing a predetermined quantity of a preselected floc precipitate with said pH adjusted waste water for causing a first precipitation of organic and inorganic materials from the waste water, subjecting the waste water to a predetermined density of electrical current flow between at least a pair of electrodes of preselected materials for electrostatically charging colloidal materials for causing said materials to be floated to the surface of the waste water by the interaction of oxygen and hydrogen bubbles evolved at said electrodes for forming a floating foam on the surface of the water, said electrical current flow between said electrodes releasing ions of the preselected electrode materials for causing a second precipitation of materials from the waste water and acting to destroy oxygen demanding organic materials, bacteria and viruses, said oxygen bubbles evolved from at least one electrode acting to oxidize organic odor and color causing materials in the water, removing the floating foamed colloidal material from the surface of the water, transferring the treated waste water and a portion of said second floc precipitate to an area of substantial quiescence where said portion of said second precipitate causes a third precipitation of materials from the water, withdrawing the water substantially free of floc precipitate from said quiescent area, performing a second measurement of pH of the water, adjusting the pH of the water in response to said second pH measurement, and dissolving a preselected oxidant in predetermined quantities with the water for killing bacteria and reducing the oxygen demanding and odor causing organic material remaining in the water.

2. The process described in claim 1, including the additional steps of initially measuring the resistivity of the waste water after the initial pH adjustment and first floc precipitation, and adjusting the resistivity of the waste water to a predetermined value in response to said initial resistivity measurement.

3. The process described in claim 2, including the additional steps of initially determining the color of the waste water after said initial resistivity measurement and adjustment, and adjusting said predetermined quantity of said preselected floc precipitate initially mixed with said pH adjusted waste water for controlling said first precipitation of materials from the waste water for adjusting the color of the water to a predetermined value.

4. The process described in claim 1, including the additional steps of measuring the quantity of said first precipitate material obtained from the waste water, removing the excess of said first precipitate material exceeding a predetermined measured quantity, and drying said removed excess first precipitate material and said removed foamed colloidal material for reclaiming valuable minerals and other materials therefrom.

5. The process described in claim 1, including the additional steps of measuring the quantity of said second and third precipitate materials obtained from the waste water, removing the excess of said second and third precipitate materials exceeding predetermined measured quantities of each of said materials, and storing said excess of said second and third precipitate materials for use as said preselected floc precipitate initially mixed with said pH adjusted water.

6. The process described in claim 5, including the additional steps of measuring the quantity of said second and third precipitate materials stored for use as said preselected floc precipitate initially mixed with said pH adjusted water, removing the excess of said stored second and third precipitate materials exceeding a predetermined measured quantity, and drying said removed excess second and third precipitate material for reclaiming valuable minerals and other materials therefrom.

7. The process described in claim 3, including the additional steps of performing a second measurement of resistivity of the water, performing a second determination of color of the water, measuring the volume and flow rate of waste water being treated, and generating said predetermined quantity of said preselected oxidant in response to said respective volume, flow rate and resistivity measurements and said color determination.

8. The process described in claim 7, wherein the step of generating said selected oxidant further generates preselected acid and caustic solutions for use in adjusting the pH of the waste water.

9. The process described in claim 1, including the additional step of allowing the water and said dissolved oxidant to stand quiesently for a predetermined time period for permitting said oxidant additional time in which to act on bacteria, oxygen demanding and odor causing organic materials and other pollutants prior to discharge.

10. The process described in claim 1, including the additional steps of providing a bubble curtain of compressed air through which the initially pH adjusted water mixed with said predetermined quantity of said preselected floc precipitate must pass for floating coalesced colloidal material and other pollutants to the surface of the water as a floating foam, removing said foam of coalesced colloidal material and other pollutants from the waste water surface prior to said waste water being subjected to said electrical current, and drying said removed foamed colloidal materials for reclaiming valuable minerals and other materials therefrom.

11. A waste water treatment process for removing colloidal, oxygen demanding and odor causing organic materials, inorganic materials and other pollutants from the water, comprising the steps of initially measuring the pH of the waste water, initially adjusting the pH of the waste water to a predetermined value in response to said initial measurement, initially mixing a predetermined quantity of a preselected floc precipitate with said pH adjusted waste water for causing a first precipitation of materials from the waste water, initially measuring the resistivity of the waste water, adjusting the resistivity of the waste water to a predetermined value in response to said initial resistivity measurement, initially determining the color of the waste water, adjusting said predetermined quantity of said preselected floc precipitate initially mixed with said pH adjusted waste water for controlling said first floc precipitation of materials from the waste water for adjusting the color of the water to a predetermined value, subjecting the waste water to a predetermined density of electrical current flow between at least a pair of electrodes of preselected materials for electrostatically charging the colloidal materials in the waste water, said electrostatically charged colloidal materials coalescing and floating to the surface of the waste water by the interaction of oxygen and hydrogen bubbles evolved at said electrodes for forming a floating foam on the surface of the water, said electrical current flow between said electrodes releasing ions of the preselected electrode materials for causing a second floc precipitation of materials from the waste water and acting to destroy oxygen demanding organic materials, bacteria and viruses, said oxygen bubbles evolved from at least one electrode acting to oxidize organic odor and color causing materials in the water, removing the floating foamed colloidal material from the surface of the water, transferring the waste water and a portion of said second floc precipitate of materials to an area removed from the action of said electrical current for circulating the water through said portion of said second floc precipitate for causing a third floc precipitation of materials from the water, transferring said circulated water and a portion of said second and third floc precipitates through which the water has circulated to an area of substantial quiescence where said portion of said second and third floc precipitates causes a fourth floc precipitation of materials from the water, withdrawing the waste water substantially free of floc precipitate from said quiescent area, performing a second measurement of pH and resistivity and a second determination of color of the water, adjusting the pH of the water in response to said second pH measurement, dissolving a preselected oxidant in predetermined quantities with the water for further adjusting the resistivity and color of the water in response to said second measurement of resistivity and said second determination of color, said oxidant further killing bacteria and reducing the oxygen demanding and odor causing organic materials remaining in the water.

12. The process described in claim 11, including the additional steps of measuring the quantity of said first floc precipitate material obtained from the waste water, removing the excess of said first floc precipitate material exceeding a predetermined measured quantity, and drying said removed excess first floc precipitate material and said removed foamed colloidal material for reclaiming valuable minerals and other materials therefrom.

13. The process described in claim 11, including the additional steps of measuring the quantity of said second floc material precipitate obtained from the water, measuring the excess of said second floc precipitate exceeding predetermined measured quantities of said material, and storing said excess of said second floc precipitate materials for use as said preselected floc precipitate initially mixed with said pH adjusted water.

14. The process described in claim 11, including the additional steps of measuring the quantity of said fourth floc precipitate of materials obtained from the water, removing the excess of said fourth floc precipitate materials exceeding a predetermined measured quantity of said fourth precipitate material, and storing said excess of said fourth floc precipitate with said second floc precipitate material for use as said preselected floc precipitate initially mixed with said pH adjusted water.

15. The process described in claim 14, including the additional steps of measuring the quantity of said second and fourth floc precipitate materials stored for use as said preselected floc precipitate initially mixed with said pH adjusted water, removing the excess of said stored second and fourth floc precipitate materials exceeding a predetermined measured quantity, and drying said removed excess second and fourth floc precipitate materials for reclaiming valuable minerals and other materials therefrom.

16. The process as described in claim 11, including the additional steps of measuring the volume and flow rate of the waste water under treatment, and generating said predetermined quantity of said preselected oxidant in response to said respective volume, flow rate and second resistivity measurements and said second color determination.

17. The process as described in claim 16, wherein the step of generating said selected oxidant further generates preselected acid and caustic solutions for use in adjusting the pH of the waste water.

18. The process described in claim 11, including the additional step of allowing the water and said dissolved oxidant to stand quiescently for a predetermined time period for permitting said oxidant additional time in which to act on bacteria, oxygen demanding and odor causing organic materials and other pollutants prior to discharge.

19. The process described in claim 11, including the additional steps of providing a bubble curtain of compressed air through which the initially pH adjusted water mixed with said predetermined quantity of said preselected floc precipitate must pass for floating coalesced colloidal material and other pollutants to the surface of the water as a floating foam, removing said foam of coalesced colloidal material and other pollutants from the waste water surface prior to said waste water being subjected to said electrical current, and drying said removed foamed colloidal material for reclaiming valuable minerals and other materials therefrom.

20. Apparatus for removing colloidal, oxygen demanding and odor causing organic materials, inorganic materials and other pollutants from waste water, comprising a preliminary treatment tank for initially admitting the waste water, first pH measurement means for measuring the pH of the waste water admitted into said tank, first pH adjustment means cooperating with said preliminary treatment tank for initially adjusting the pH of the waste water therein to a predetermined value in response to said first pH measurement, means cooperating with said preliminary treatment tank for initially mixing a predetermined quantity of a preselected floc precipitate with said pH adjusted waste water in said preliminary treatment tank for causing a first precipitation of materials from the waste water, means for discharging the waste water substantially free of said precipitate materials from said preliminary treatment tank, an electrode tank assembly for receiving said waste water from said preliminary treatment tank and subjecting the water to a predetermined density of electrical current flow between at least a pair of electrodes of preselected materials for electrostatically charging the colloidal materials in the waste water, said electrostatically charged colloidal materials coalescing and floating to the surface of the waste water and the top surface of said electrodes by the interaction of oxygen and hydrogen bubbles evolved at said electrodes for forming a floating foam on the surface of the water and the top surface of said electrodes, said electrical current flow between said electrodes releasing ions of the preselected electrode materials for causing a second precipitation of materials from the waste water, said ions of the preselected electrode materials further acting to destroy oxygen demanding organic materials, bacteria and viruses, said oxygen bubbles evolved from at least one electrode further acting to oxidize organic odor and color causing materials in the water, wiping means for wiping the top surface of said electrodes for removing the floating foamed colloidal material from the surface of the water and the top surface of said electrodes, means for discharging the waste water and a portion of said second precipitate of materials from said electrode tank, a floc settling tank for receiving the waste water and said portion of said second precipitate of materials and allowing the water to quiescently accumulate with said portion of said second precipitate for causing a third precipitation of materials from the waste water, means for discharging the water substantially free of precipitate materials from said floc settling tank, a pH and oxidant adjustment tank for receiving the water substantially free of precipitate materials from said floc settling tank, second pH measurement means for measuring the pH of the water discharged from said floc settling tank, second pH adjustment means cooperating with said pH and oxidant adjustment tank for adjusting the pH of the water therein to a predetermined value in response to said second pH measurement, a source of a preselected oxidizing material, means for transferring a predetermined quantity of said oxidizing material to said pH and oxidant adjustment tank and dissolving said predetermined quantity of said preselected oxidant with the water for killing bacteria and reducing the oxygen demanding color, and odor causing organic material remaining in the water.

21. The apparatus as described in claim 20, wherein said first pH adjustment means comprises
   a source of a preselected acid solution interconnected to said preliminary treatment tank,
   a source of a preselected caustic solution interconnected to said preliminary treatment tank, and
   a pair of pumps, one of which is disposed in the interconnection between said acid solution source and the other of which is disposed in the interconnection between said caustic solution source and said preliminary treatment tank, each of said pumps being operable by control circuit means responsive to said first pH measurement.

22. The apparatus as described in claim 20, wherein said wiping means comprises
   a drive shaft having spaced chain sprockets and a drive sprocket disposed thereon,
   means cooperating with said drive sprocket to rotate said drive shaft,
   an idler shaft horizontally spaced from said drive shaft and having spaced chain sprockets disposed thereon in alignment with said chain sprockets of said drive shaft,
   a pair of chains, one of which is disposed between corresponding pairs of aligned chain sprockets on said drive and idler shafts for forming a pair of spaced parallel driven chains,
   a plurality of paddle blades, each having a flexible non-conducting blade edge, each of said blades being fixed horizontally between said parallel driven chains for continuous horizontal movement with said driven chains, and
   a frame assembly attached to said electrode tank for supporting said drive and idler shafts spaced above the top surface of said electrodes for allowing the non-conducting blade edges of said paddle blades to sweep longitudinally across the top surface of said electrodes and remove said floating foamed colloidal material.

23. The apparatus as described in claim 20, wherein said means for discharging the waste water and a portion of said second precipitate materials from said electrode tank comprises
   a plurality of vertically spaced discharge pipes communicating with the interior of said electrode tank each having a valve means for controlling the flow of water and a portion of said second precipitate materials through each pipe from said electrode tank, and
   a discharge manifold receiving the waste water and controlled quantity of said second precipitate material for transfer to said floc settling tank.

24. The apparatus as described in claim 20, including
   an injection manifold receiving said waste water from said means for discharging said water substantially free of said precipitate materials from said preliminary treatment tank, and
   a plurality of vertically spaced injection pipes interconnecting said manifold and said electrode tank assembly for uniform distribution of the water over the entire height of the electrodes in said electrode tank assembly.

25. The apparatus as described in claim 20, wherein said means for discharging the water substantially free of precipitate materials from said floc settling tank comprises
   a weir disposed at one end of said tank into which said quiescently accumulating water spills when the water has reached a preselected depth, and
   means for discharging the water from said weir.

26. The apparatus as described in claim 21, wherein said second pH adjustment means includes
   said sources of preselected acid and caustic solutions as utilized in said first pH adjustment means,
   interconnecting piping connecting each of said sources of acid and caustic solution to said pH and oxidant adjustment tank, and
   a pair of pumps, one of which is disposed in the interconnection between said acid source and the other of which is disposed in the interconnection between said caustic solution source and said pH and oxidant adjustment tank, said pumps operable by control circuit means responsive to said second pH measurement.

27. The apparatus described in claim 20, including
   first resistivity measurement means for measuring the resistivity of the waste water after the initial pH adjustment and first inorganic precipitate in said tank, and
   means for recycling a portion of the water substantially free of floc precipitate discharged from said floc settling tank into a mixing tank compartment of said preliminary treatment tank for adjusting the resistivity of the waste water to a predetermined value in response to said first resistivity measurement.

28. The apparatus described in claim 27, including
   first color measurement means for determining the color of the waste water discharged from said preliminary treatment tank, and
   means responsive to said color measurement means for adjusting said predetermined quantity of said preselected floc precipitate transferred from said floc precipitate source for initial mixing with said pH adjusted waste water in said preliminary treatment tank for controlling said first precipitation of materials from the waste water and adjusting the color of the water to a predetermined value.

29. The apparatus as described in claim 28, wherein said means responsive to said color measurement means for adjusting said predetermined quantity of said preselected floc precipitate utilized for initial mixing with the pH adjusted waste water comprises
   a source of said preselected floc precipitate interconnected with said preliminary treatment tank, and
   a pump disposed in said interconnection between said source of preselected floc precipitate and said preliminary treatment tank and operable by control circuit means responsive to said first color measurement means.

30. The apparatus as described in claim 20, including
   first precipitate measuring means for measuring the quantity of said first material precipitated in said preliminary treatment tank,
   means for removing the excess of said first precipitate material exceeding a predetermined quantity measured by said first precipitate measuring means, and
   means for receiving and drying said removed excess of said first precipitate material and said removed foamed colloidal material for allowing reclamation of valuable minerals and other materials therefrom.

31. The apparatus as described in claim 20, including
   second precipitate measuring means for measuring the quantity of said second material precipitated in said electrode tank,
   third precipitate measuring means for measuring the quantity of said third material precipitated in said floc settling tank,
   means for removing the excess of said second and third precipitate materials from said electrode floc settling tanks when said second and third precipitates exceed a predetermined measured quantity as measured by said second and third precipitate measuring means, and transferring said excess of said second and third precipitate materials to said floc precipitate source for storage and reuse.

32. The apparatus as described in claim 31, including fourth precipitate measuring means for measuring the quantity of said precipitate materials stored in said floc precipitate source,
means for removing the excess of said stored precipitate materials exceeding a predetermined quantity measured by said fourth precipitate measuring means, and
means for receiving and drying said removed excess of said precipitate material for reclamation of valuable minerals and other materials therefrom.

33. The apparatus as described in claim 20, including
means for measuring the volume and flow rate of the waste water,
second resistivity measurement means for measuring the resistivity of the water discharged from said floc settling tank,
second color determination means for determining the color of the water discharged from said floc settling tank,
oxidant generating means for generating a predetermined quantity of said preselected oxidizing material in response to said volume, flow rate and said second resistivity measurement and said second color determination.

34. The apparatus as described in claim 33, wherein said oxidant generating means also generates a continuous supply of said preselected acid and caustic solutions, and further includes means for transferring said generated acid and caustic solutions to said sources for storage.

35. The apparatus as described in claim 20, further including a polishing pond for receiving the water discharged from said pH and oxidant adjustment tank for allowing the water and said dissolved oxidant to stand quiescently for a predetermined time period for permitting said oxidant additional time in which to act on bacteria, oxygen demanding and odor causing organic materials and other pollutants prior to discharge.

36. The apparatus as described in claim 20, further including a source of compressed air,
porous means disposed in the bottom of said preliminary treatment tank for receiving air from said compressed air tank and producing a vertical bubble curtain within said preliminary treatment tank through which the initially pH adjusted water mixed with said predetermined quantity of said preselected floc precipitate must pass for floating coalesced colloidal material and other pollutants to the surface of the water as a floating foam, and
sweeping means for sweeping the top surface of the waste water in said preliminary treatment tank for removing said foam of coalesced colloidal material and other pollutants from the waste water prior to the discharge of the waste water into said electrode tank.

37. The apparatus as described in claim 36, wherein said porous means comprises an elongated block of porous material extending across the bottom of said preliminary treatment tank.

38. The apparatus as described in claim 36, wherein said sweeping means includes
a drive shaft having spaced chain sprockets and a drive sprocket disposed thereon,
means cooperating with said drive sprocket to rotate said drive shaft,
an idler shaft horizontally spaced from said drive shaft and having spaced chain sprockets disposed thereon in alignment with said chain sprockets of said drive shaft,
a pair of chains, one of which is disposed between corresponding pairs of aligned chain sprockets on said drive and idler shafts for forming a pair of spaced parallel driven chains,
a plurality of paddle blades fixed horizontally between said parallel driven chains for continuous horizontal movement with said driven chains, and
a frame assembly attached to said preliminary treatment tank for supporting said drive and idler shafts spaced above the surface of the water in said tank for allowing said paddle blades to sweep longitudinally across the water surface and remove said floating foamed colloidal material.

39. Apparatus for removing colloidal, oxygen demanding and odor causing organic materials, inorganic materials and other pollutants from waste water, comprising
a preliminary treatment tank for initially admitting the waste water,
first pH measurement means for measuring the pH of the waste water admitted into said tank,
first pH adjustment means cooperating with said preliminary treatment tank for initially adjusting the pH of the waste water therein to a predetermined value in response to said first pH measurement,
a source of a preselected floc precipitate,
means interconnected between said preliminary treatment tank and said source of preselected floc precipitate for controlling the quantity of said floc precipitate mixed with said waste water in said preliminary treatment tank for causing a first precipitation of materials from the waste water,
means for discharging the waste water substantially free of said precipitate materials from said preliminary treatment tank,
means for measuring the volume and flow rate of the waste water,
first color determination means for determining the color of the waste water discharged from said preliminary treatment tank,
control circuit means responsive to said first color determination means for controlling said means interconnected between said preliminary treatment tank and said floc precipitate for adjusting the color of the waste water to a predetermined value,
an electrode tank assembly for receiving said waste water from said mixing tank and subjecting the water to a predetermined density of electrical current flow between at least a pair of electrodes of preselected materials for electrostatically charging the colloidal materials in the waste water, said electrostatically charged colloidal materials coalescing and floating to the surface of the waste water and the top surface of said electrodes by the interaction of oxygen and hydrogen bubbles evolved at said electrodes for forming a floating foam on the surface of the water and the top surface of said electrodes,
said electrical current flow between said electrodes releasing ions of the preselected electrode materials for causing a second precipitation of materials from the waste water,
said ions of the preselected electrode materials further acting to destroy oxygen demanding organic materials, bacteria and viruses,
said oxygen bubbles evolved from at least one electrode further acting to oxidize organic odor causing materials in the water,
wiping means for wiping the top surface of said electrodes for removing the floating foamed colloidal material from the surface of the water and the top surface of said electrodes,
means for discharging the waste water and a portion of said second precipitate of materials from said electrode tank,
a floc settling tank for receiving the waste water and said portion of said second precipitate of materials, circulating the water through said second precipitate for causing a third precipitation of materials and thereafter allowing the water and a portion of said third precipitate to quiescently accumulate with said portion of said third precipitate for causing a fourth precipitation of materials from the waste water,
means for discharging the water substantially free of any precipitate materials from said floc settling tank, a pH and oxidant adjustment tank for receiving the water substantially free of precipitate materials from said floc settling tank, second pH measurement means for measuring the pH of the water discharged from said floc settling tank, second pH adjustment means cooperating with said pH and oxidant adjustment tank for adjusting the pH of the water therein to a predetermined value in response to said second pH measurement, a source of a preselected oxidizing material, means for transferring a predetermined quantity of said oxidizing material to said pH and oxidant adjustment tank and dissolving said predetermined quantity of said preselected oxidant with the water for killing bacteria and reducing the oxygen demanding and odor causing organic material remaining in the water.

40. The apparatus as described in claim 39, wherein said first pH adjustment means comprises a source of a preselected acid solution interconnected to said preliminary treatment tank, a source of a preselected caustic solution interconnected to said preliminary treatment tank, and a pair of pumps, one of which is disposed in the interconnection between said acid solution source and the other of which is disposed in the interconnection between said caustic solution source and said preliminary treatment tank, each of said pumps being operable by control circuit means responsive to said first pH measurement.

41. The apparatus as described in claim 40, wherein said electrode tank comprises a rectangular tank structure having an integral bottom and open top, a plurality of rectangular spaced-apart electrodes vertically oriented and disposed within said tank structure with opposite ends of successive ones of said electrodes contacting opposite walls of said tank structure for providing an alternating baffled path for the waste water moving through said electrode tank and to provide the waste water maximum exposure time to the current between adjacent electrodes, and control circuit means connected to each of said electrodes for controlling the density of electrical current flow between said electrodes in response to said volume, flow rate and color measurements.

42. The apparatus as described in claim 41, wherein said wiping means comprises a drive shaft having spaced chain sprockets and a drive sprocket disposed thereon, means cooperating with said drive sprocket to rotate said drive shaft, an idler shaft horizontally spaced from said drive shaft and having spaced chain sprockets disposed thereon in alignment with said chain sprockets of said drive shaft, a pair of chains, one of which is disposed between corresponding pairs of aligned chain sprockets on said drive and idler shafts for forming a pair of spaced parallel driven chains, a plurality of paddle blades, each having a flexible non-conducting blade edge, each of said blades being fixed horizontally between said parallel driven chains for continuous horizontal movement with said driven chains, a frame assembly attached to said electrode tank for supporting said drive and idler shafts spaced above the top edge surface of said electrodes for allowing the non-conducting blade edges of said paddle blade to sweep longitudinally across the top edge surface of said electrodes and remove said floating foamed colloidal material.

43. The apparatus as described in claim 42, wherein said means for discharging the waste water and a portion of said second precipitate of materials from said electrode tank comprises a plurality of vertically spaced discharge pipes communicating with the interior of said electrode tank each having a valve means for controlling the flow of water and a portion of said second precipitate materials through each pipe from said electrode tank, and a discharge manifold receiving the waste water and controlled quantity of said second precipitate material for transfer to said floc settling tank.

44. The apparatus as described in claim 43, including an injection manifold receiving said waste water from said means for discharging said water substantially free of said precipitate materials from said preliminary treatment tank, and a plurality of vertically spaced injection pipes interconnecting said manifold and said electrode tank assembly for uniform distribution of the water over the entire height of the electrodes in said electrode tank assembly.

45. The apparatus as described in claim 44, wherein said floc settling tank comprises a rectangular tank structure having an integral bottom, a first partition plate fixed between opposite side walls of said tank structure and adjacent one end of said tank for defining a first vertical compartment, the bottom end of said plate spaced from said bottom of said tank and spaced a greater distance from said one end of said tank than the top end of said plate, a second partition plate fixed between opposite side walls of said tank structure and spaced from said first plate toward the other end of said tank for defining a second vertical compartment between said first and second plates, the bottom end of said second plate sealingly fixed to said bottom of said tank with the top end of said second plate spaced downwardly from the top edges of the side walls of said tank, said top end of said second plate slanting slightly toward said one end of said tank, a third partition plate fixed vertically between opposite side walls of said tank structure and spaced from said second plate toward the other end of said tank for defining a third vertical compartment between said second and third plates and a fourth compartment between said third plate and the other end of said tank, the bottom end of said third plate spaced from said bottom of said tank for permitting communication between said third and fourth compartments, a T-shaped pipe disposed in said first compartment with the cross-part of the T-shaped pipe being positioned adjacent said tank bottom and having apertures facing said one end for discharging the waste water and said second precipitate into the bottom of said first compartment where the water circulates through said second precipitate and up into said second compartment for causing a third precipitation of said materials, said water filling said second compartment and gently spilling over the top end of said second plate into said third compartment and carrying a portion of said third precipitate into said third compartment, said water filling said third and fourth compartments and passing through said accumulated portion of said third precipitate present in said third and fourth compartments for causing a fourth material precipitation to occur in said third and fourth compartments.

46. The apparatus as described in claim 45, wherein said means for discharging the water substantially free of precipitate materials from said floc settling tank comprises a weir disposed at said other end of said tank at a preselected height into which said accumulating water spills when the water has reached said preselected height, and means for discharging the water from said weir.

47. The apparatus as described in claim 46, wherein said second pH adjustment means includes said sources of preselected acid and caustic solutions as utilized in said first pH adjustment means, interconnecting piping connecting each of said sources of acid and caustic solution to said pH and oxidant adjustment tank, and a pair of pumps, one of which is disposed in the interconnection between said acid solution source and the other of which is disposed in the interconnection between said caustic solution source and said pH and oxidant adjustment tank, said pumps operable by control circuit means responsive to said second pH measurement.

48. The apparatus described in claim 47, including
first resistivity measurement means for measuring the resistivity of the waste water after the initial pH adjustment and first inorganic floc precipitate in said tank, and
means for recycling a portion of the water substantially free of floc precipitate discharged from said floc settling tank into a mixing tank compartment of said preliminary treatment tank for adjusting the resistivity of the waste water to a predetermined value in response to said first resistivity measurement.

49. The apparatus as described in claim 48, wherein said means responsive to said color measurement means for adjusting said predetermined quantity of said preselected floc precipitate utilized for initial mixing with the pH adjusted waste water comprises a pump disposed in said interconnection between said source of preselected floc precipitate and said preliminary treatment tank and operable by said control circuit means responsive to said first color measurement means.

50. The apparatus as described in claim 49, including
first precipitate measuring means for measuring the quantity of said first material precipitated in said preliminary treatment tank,
means for removing the excess of said first precipitate material exceeding a predetermined quantity measured by said first precipitate measuring means, and
means for receiving and drying said removed excess of said first precipitate material for allowing reclamation of valuable minerals and other inorganic materials therefrom.

51. The apparatus as described in claim 50, including
second precipitate measuring means for measuring the quantity of said second material precipitated in said electrode tank,
third precipitate measuring means for measuring the quantity of said fourth material precipitated in said floc settling tank,
means for removing the excess of said second and fourth precipitate materials from said electrode and floc settling tanks when said second and fourth precipitates exceed a predetermined quantity measured by said second and third precipitate measuring means, and
transferring said excess of said second and fourth precipitate materials to said floc precipitate source for storage and reuse.

52. The apparatus as described in claim 51, including fourth precipitate measuring means for measuring the quantity of said precipitate materials stored in said floc precipitate source,
means for removing the excess of said stored precipitate materials exceeding a predetermined quantity measured by said fourth precipitate measuring means, and
means for receiving and drying said removed excess of said precipitate materials for reclamation of valuable minerals and other materials therefrom.

53. The apparatus as described in claim 52, including
second resistivity measurement means for measuring the resistivity of the water discharged from said floc settling tank,
second color determination means for determining the color of the water discharged from said floc settling tank, and
oxidant generating means for generating a predetermined quantity of said preselected oxidizing material in response to said volume, flow rate and said second resistivity measurement and said second color determination.

54. The apparatus as described in claim 53, wherein said oxidant generating means also generates a continuous supply of said preselected acid and caustic solutions, and further includes means for transferring said generated acid and caustic solutions to said sources for storage.

55. The apparatus as described in claim 54, further including a polishing pond for receiving the water discharged from said pH and oxidant adjustment tank for allowing the water and said dissolved oxidant to stand quiescently for a predetermined time period for permitting said oxidant additional time in which to act on bacteria, oxygen demanding and odor causing organic materials and other pollutants prior to discharge.

56. The apparatus as described in claim 39, further including
a source of compressed air,
porous means disposed in the bottom of said preliminary treatment tank for receiving air from said compressed air tank and producing a vertical bubble curtain within said preliminary treatment tank through which the initially pH adjusted water mixed with said predetermined quantity of said preselected floc precipitate must pass for floating coalesced colloidal material and other pollutants to the surface of the water as a floating foam, and
sweeping means for sweeping the top surface of the waste water in said preliminary treatment tank for removing said foam of coalesced colloidal material and other pollutants from the waster water prior to the discharge of the waste water into said electrode tank.

57. The apparatus as described in claim 56, wherein said porous means comprises an elongated block of porous material extending across the bottom of said preliminary treatment tank.

58. The apparatus as described in claim 57, wherein said sweeping means includes
a drive shaft having spaced chain sprockets and a drive sprocket disposed thereon,
means cooperating with said drive sprocket to rotate said drive shaft,
an idler shaft horizontally spaced from said drive shaft and having spaced chain sprockets disposed thereon in alignment with said chain sprockets of said drive shaft,
a pair of chains, one of which is disposed between corresponding pairs of aligned chain sprockets on said drive and idler shafts for forming a pair of spaced parallel driven chains,
a plurality of paddle blades fixed horizontally between said parallel driven chains for continuous horizontal movement with said driven chains, and
a frame assembly attached to said preliminary treatment tank for supporting said drive and idler shafts spaced above the surface of the water in said tank for allowing said paddle blades to sweep longitudinally across the water surface and remove said floating foamed colloidal material.

* * * * *